US008646551B2

(12) United States Patent
Mattes et al.

(10) Patent No.: US 8,646,551 B2
(45) Date of Patent: Feb. 11, 2014

(54) POWER DRIVEN WHEELCHAIR

(75) Inventors: John Mattes, Columbia Station, OH (US); Darryl Peters, Elyria, OH (US); Bruce A. Jaenke, Parma, OH (US); Ricky J. McCullar, Olmsted Township, OH (US); Gary E. Chopcinski, North Ridgeville, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 13/412,034

(22) Filed: Mar. 5, 2012

(65) Prior Publication Data

US 2012/0166020 A1 Jun. 28, 2012

Related U.S. Application Data

(63) Continuation of application No. 11/513,802, filed on Aug. 31, 2006, now Pat. No. 8,127,875.

(60) Provisional application No. 60/712,987, filed on Aug. 31, 2005, provisional application No. 60/727,005, filed on Oct. 15, 2005, provisional application No. 60/726,983, filed on Oct. 15, 2005, provisional application No. 60/726,666, filed on Oct. 15, 2005, provisional application No. 60/726,981, filed on Oct. 15, 2005, provisional application No. 60/726,993, filed on Oct. 15, 2005, provisional application No. 60/727,249, filed on Oct. 15, 2005, provisional application No. 60/727,250, filed on Oct. 15, 2005.

(51) Int. Cl.
*B60L 15/20* (2006.01)
(52) U.S. Cl.
USPC ........................................ 180/65.8; 180/65.1
(58) Field of Classification Search
USPC .............................................. 180/65.8, 65.1
See application file for complete search history.

(56) References Cited

U.S. PATENT DOCUMENTS 1,114,948 A 10/1914 Walker
2,759,525 A 8/1956 Reis
(Continued)

FOREIGN PATENT DOCUMENTS

DE 3923937 1/1990
EP 0345785 12/1989
(Continued)

OTHER PUBLICATIONS

Office action from Australian Application No. 2006284747 dated Jul. 1, 2011.

(Continued)

*Primary Examiner* — Jeffrey J Restifo
(74) *Attorney, Agent, or Firm* — Calfee, Halter & Griswold LLP

(57) ABSTRACT

A power driven wheelchair and a method for operating same are provided. In one embodiment, the power driven wheelchair includes a system controller with a main controller, a storage device, and at least one input device, a motor assembly, and a common bus. The motor assembly may include a drive motor, a local controller, and a sensor sensing a condition associated with the drive motor and in communication with the local controller. In another embodiment, the power driven wheelchair includes the system controller, an actuator assembly, and the common bus. The actuator assembly may include an actuator mechanism, a local controller, and a sensor sensing a condition associated with the actuator mechanism and in communication with the local controller. Multiple embodiments of the method are related to controlling various arrangements of motor assemblies or actuator assemblies.

12 Claims, 21 Drawing Sheets

(56) References Cited

U.S. PATENT DOCUMENTS

| | | | |
|---|---|---|---|
| 3,454,305 A | 7/1969 | Gilmour | |
| 4,207,959 A | 6/1980 | Youdin et al. | |
| 4,736,921 A | 4/1988 | Zane et al. | |
| 4,779,884 A | 10/1988 | Minati | |
| 4,951,766 A | 8/1990 | Basedow et al. | |
| 5,033,000 A | 7/1991 | Littlejohn et al. | |
| 5,187,797 A | 2/1993 | Nielsen et al. | |
| 5,197,559 A | 3/1993 | Garin et al. | |
| 5,234,066 A | 8/1993 | Ahsing et al. | |
| 5,245,558 A | 9/1993 | Hachey | |
| 5,248,007 A | 9/1993 | Watkins et al. | |
| 5,261,715 A | 11/1993 | Blatt et al. | |
| 5,299,824 A | 4/1994 | Roberts et al. | |
| 5,516,021 A | 5/1996 | Douglass | |
| 5,547,038 A | 8/1996 | Madwed | |
| 5,555,949 A | 9/1996 | Stallard et al. | |
| 5,647,520 A | 7/1997 | McDaid | |
| 5,718,442 A | 2/1998 | Alexander et al. | |
| 5,794,730 A | 8/1998 | Kamen | |
| 5,899,526 A | 5/1999 | LaPointe et al. | |
| 5,961,561 A | 10/1999 | Wakefield | |
| 6,068,280 A | 5/2000 | Torres | |
| 6,152,246 A | 11/2000 | King et al. | |
| 6,154,690 A | 11/2000 | Coleman | |
| 6,170,598 B1 | 1/2001 | Furukawa | |
| 6,290,011 B1 | 9/2001 | Langaker et al. | |
| 6,354,390 B1 | 3/2002 | Uchiyama et al. | |
| 6,409,265 B1 | 6/2002 | Koerlin et al. | |
| 6,425,635 B1 | 7/2002 | Pulver | |
| 6,588,792 B1 | 7/2003 | Koerlin et al. | |
| 6,688,571 B1 | 2/2004 | Pauls | |
| 6,715,784 B2 | 4/2004 | Koerlin et al. | |
| 6,816,762 B2 | 11/2004 | Hensey et al. | |
| 6,819,981 B2 | 11/2004 | Wakefield, II et al. | |
| 6,832,745 B2 | 12/2004 | Lindsay | |
| 6,842,692 B2 | 1/2005 | Fehr et al. | |
| 6,866,107 B2 | 3/2005 | Heinzmann et al. | |
| 6,868,931 B2 | 3/2005 | Morrell et al. | |
| 6,871,122 B1 | 3/2005 | Wakefield, II | |
| 6,874,591 B2 | 4/2005 | Morrell et al. | |
| 6,926,106 B2 | 8/2005 | Richey, II et al. | |
| 6,938,923 B2 | 9/2005 | Mulhem et al. | |
| 6,974,194 B2 | 12/2005 | Schreiber et al. | |
| 6,976,699 B2 | 12/2005 | Koerlin | |
| 6,989,642 B2 | 1/2006 | Wakefield, II et al. | |
| 6,991,292 B2 | 1/2006 | Kasten | |
| 7,003,381 B2 | 2/2006 | Wakefield, II | |
| 7,083,019 B2 | 8/2006 | Chiou et al. | |
| 7,113,854 B2 | 9/2006 | Mansell et al. | |
| 7,148,638 B2 | 12/2006 | Wakefield, II | |
| 7,159,181 B2 * | 1/2007 | Mansell et al. | 715/744 |
| 7,171,288 B2 | 1/2007 | Wakefield, II | |
| 7,246,856 B2 | 7/2007 | Kruse et al. | |
| 7,262,762 B2 | 8/2007 | McAlindon | |
| 7,296,312 B2 | 11/2007 | Menkedick et al. | |
| 7,310,776 B2 * | 12/2007 | Mansell et al. | 715/744 |
| 7,374,679 B2 | 5/2008 | Huang et al. | |
| 7,403,844 B2 | 7/2008 | Chopcinski et al. | |
| 7,461,897 B2 | 12/2008 | Kruse et al. | |
| 7,635,164 B2 | 12/2009 | Torres et al. | |
| 7,668,634 B2 | 2/2010 | Mansell et al. | |
| 8,065,051 B2 | 11/2011 | Chopcinski et al. | |
| 8,073,585 B2 | 12/2011 | Jaenke et al. | |
| 8,073,588 B2 | 12/2011 | Peters et al. | |
| 8,127,875 B2 * | 3/2012 | Mattes et al. | 180/65.8 |
| 8,145,373 B2 * | 3/2012 | Jaenke et al. | 701/22 |
| 8,285,440 B2 | 10/2012 | Jaenke | |
| 8,315,753 B2 * | 11/2012 | Meyer | 701/22 |
| 8,437,899 B2 | 5/2013 | Jaenke et al. | |
| 2002/0008718 A1 | 1/2002 | Obradovich | |
| 2003/0001875 A1 | 1/2003 | Black | |
| 2003/0109973 A1 | 6/2003 | Hensey et al. | |
| 2003/0120601 A1 | 6/2003 | Ouye et al. | |
| 2003/0127261 A1 | 7/2003 | Borroni-Bird et al. | |
| 2004/0002305 A1 | 1/2004 | Byman-Kivivuori et al. | |
| 2004/0252341 A1 | 12/2004 | Adachi et al. | |
| 2004/0259591 A1 | 12/2004 | Grams et al. | |
| 2005/0062726 A1 | 3/2005 | Marsden et al. | |
| 2005/0107925 A1 | 5/2005 | Enigk et al. | |
| 2005/0195173 A1 | 9/2005 | McKay | |
| 2005/0236196 A1 * | 10/2005 | Runkles et al. | 180/65.1 |
| 2005/0236208 A1 | 10/2005 | Runkles et al. | |
| 2005/0236217 A1 | 10/2005 | Koerlin et al. | |
| 2007/0050096 A1 | 3/2007 | Mattes et al. | |
| 2007/0050111 A1 | 3/2007 | Mattes et al. | |
| 2007/0056780 A1 * | 3/2007 | Jaenke et al. | 180/65.1 |
| 2007/0056781 A1 * | 3/2007 | Mattes et al. | 180/65.1 |
| 2007/0056782 A1 * | 3/2007 | Chopcinski et al. | 180/65.1 |
| 2007/0074917 A1 * | 4/2007 | Jaenke et al. | 180/65.1 |
| 2007/0080003 A1 * | 4/2007 | Koerlin et al. | 180/65.1 |
| 2008/0030463 A1 | 2/2008 | Forest | |
| 2008/0249694 A1 | 10/2008 | Jaenke et al. | |
| 2009/0121532 A1 | 5/2009 | Kruse et al. | |
| 2009/0153370 A1 | 6/2009 | Cooper et al. | |
| 2010/0082182 A1 * | 4/2010 | Griggs et al. | 701/1 |
| 2012/0064502 A1 | 3/2012 | Chopcinski | |

FOREIGN PATENT DOCUMENTS

| | | |
|---|---|---|
| EP | 0436103 | 7/1991 |
| EP | 1148394 | 10/1991 |
| GB | 2222701 | 3/1990 |
| JP | 2008-194183 | 8/2008 |
| JP | 2009-261472 | 1/2009 |
| JP | 2009-078028 | 4/2009 |
| JP | 2010-017354 | 1/2010 |
| WO | 03034967 | 5/2003 |
| WO | 2005032924 | 4/2005 |
| WO | 2005037168 | 4/2005 |
| WO | 2005039473 | 5/2005 |
| WO | 2005039930 | 5/2005 |

OTHER PUBLICATIONS

Exam Report from Australian Application No. 2006284748 dated Sep. 14, 2011.
Office action from Australian Application No. 2006284749 dated Apr. 28, 2011.
Office action from Australian Application No. 2006284741 date May 9, 2011.
Office action from Australian Application No. 2006284753 dated Jul. 22, 2011.
Exam Report from Australian Application No. 2006284768 dated Sep. 8, 2011.
Office action from New Zealand Application No. 565,929 dated Oct. 8, 2009.
Response from New Zealand Application No. 565,929 dated Mar. 7, 2011.
Office action from New Zealand Application No. 565,929 dated Mar. 25, 2011.
Response from New Zealand Application No. 565,929 dated May 11, 2011.
Office action from New Zealand Application No. 565,930 dated Oct. 7, 2009.
Response from New Zealand Application No. 565,930 dated Feb. 22, 2011.
Office action from New Zealand Application No. 565,930 dated Mar. 10, 2011.
Response from New Zealand Application No. 565,930 dated May 5, 2011.
Office action from New Zealand Application No. 565,930 dated May 26, 2011.
Response from New Zealand Application No. 565,930 dated Jun. 24, 2011.
Office action from New Zealand Application No. 565,931 dated Oct. 8, 2009.
Response from New Zealand Application No. 565,931 dated Mar. 7, 2011.
Office action from New Zealand Application No. 565,931 dated Mar. 25, 2011.

(56) References Cited

OTHER PUBLICATIONS

Response from New Zealand Application No. 565,931 dated May 4, 2011.
Office action from New Zealand Application No. 565,932 dated Oct. 12, 2009.
Response from New Zealand Application No. 565,932 dated Mar. 21, 2011.
Office action from New Zealand Application No. 565,932 dated Mar. 29, 2011.
Response from New Zealand Application No. 565,932 dated May 13, 2011.
Office action from New Zealand Application No. 565,933 dated Sep. 28, 2009.
Response from New Zealand Application No. 565,933 dated Feb. 16, 2011.
Office action from New Zealand Application No. 565,933 dated Feb. 28, 2011.
Response from New Zealand Application No. 565,933 dated Apr. 18, 2011.
Office action from New Zealand Application No. 565,934 dated Oct. 12, 2009.
Response from New Zealand Application No. 565,934 dated Mar. 7, 2011.
Office action from New Zealand Application No. 565,934 dated Mar. 28, 2011.
Response from New Zealand Application No. 565,934 dated May 13, 2011.
Office action from New Zealand Application No. 565,935 dated Oct. 5, 2009.
Response from New Zealand Application No. 565,935 dated Feb. 4, 2011.
Office action from New Zealand Application No. 565,935 dated Feb. 18, 2011.
Response from New Zealand Application No. 565,935 dated Apr. 15, 2011.
Office action from New Zealand Application No. 591,829 dated Mar. 28, 2011.
Office action from New Zealand Application No. 591,831 dated Mar. 28, 2011.
Office action from New Zealand Application No. 592,271 dated Apr. 20, 2011.
Office action from New Zealand Application No. 592,317 dated Apr. 21, 2011.
Applicant-requested Interview Summary from U.S. Appl. No. 11/513,740 dated Jan. 27, 2012.
Response to Office Action from New Zealand Application No. 591,831 dated Jul. 23, 2012.
Response to First Office Action from EP Application No. 06813984.9 dated Oct. 18, 2012.
Office Action from New Zealand Application No. 592,271 dated Nov. 16, 2012.
Office Action for U.S. Appl. No. 13/311,140 dated Jan. 10, 2013.
Amendment with Terminal Disclaimer from U.S. Appl. No. 13/430,011 dated Dec. 7, 2012.
Notice of Allowance in U.S. Appl. No. 13/430,011 dated Jan. 9, 2013.
Response to First Examiner's Report from Australian application No. 2006284687 dated Dec. 19, 2012.
Response to Office Action from New Zealand Appl. No. 591831 dated Nov. 12, 2012.
Teknic, Inc., "The price/performance leader for OEM machine automation", Investigating Servo Architectures, 14 pgs. printed Aug. 15, 2006 from http://www.teknic.com/systems/, copyright 2006.
Office action from U.S. Appl. No. 11/513,740 dated Feb. 4, 2010.
Response from U.S. Appl. No. 11/513,740 dated Jul. 6, 2010.
Office action from U.S. Appl. No. 11/513,740 dated Oct. 4, 2010.
Response from U.S. Appl. No. 11/513,740 dated Feb. 4, 2011.
Office action from U.S. Appl. No. 11/513,740 dated Apr. 21, 2011.
Response from U.S. Appl. No. 11/513,740 dated Jul. 21, 2011.
Office action from U.S. Appl. No. 11/513,740 dated Oct. 18, 2011.
Office action from U.S. Appl. No. 11/514,016 dated Feb. 22, 2010.
Response from U.S. Appl. No. 11/514,016 filed Jul. 21, 2010.
Notice of Allowance from U.S. Appl. No. 11/514,016 dated Sep. 30, 2010.
Comments on Statement of Reasons for Allowance from U.S. Appl. No. 11/514,016 dated Oct. 29, 2010.
Notice of Allowance from U.S. Appl. No. 11/514,016 dated Jan. 19, 2011.
Notice of Allowance from U.S. Appl. No. 11/514,016 dated May 5, 2011.
Response from U.S. Appl. No. 11/514,016 dated Aug. 4, 2011.
Notice of Allowance from U.S. Appl. No. 11/514,016 dated Sep. 12, 2011.
Office action from U.S. Appl. No. 11/513,854 dated Apr. 15, 2009.
Response from U.S. Appl. No. 11/513,854 dated Oct. 15, 2009.
Office action from U.S. Appl. No. 11/513,854 dated Feb. 3, 2010.
Response from U.S. Appl. No. 11/513,854 dated Aug. 3, 2010.
Notice of Allowance from U.S. Appl. No. 11/513,854 dated Jul. 18, 2011.
Notice of Allowance from U.S. Appl. No. 11/513,854 dated Oct. 4, 2011.
U.S. Appl. No. 11/511,606, Notice of Allowance and Fees Due with Notice of Allowability, 5 pages, mailed May 8, 2008.
Response to Office action from U.S. Appl. No. 11/511,606 dated Jan. 8, 2008.
Office Action from U.S. Appl. No. 11/511,606, 5 pages, mailed Sep. 13, 2007.
Response to Office action from U.S. Appl. No. 11/511,606 dated Aug. 24, 2007.
U.S. Appl. No. 11/511,606, Final Office Action, 5 pages, mailed Jun. 7, 2007.
Response to Office action from U.S. Appl. No. 11/511,606 submitted Mar. 21, 2007.
U.S. Appl. No. 11/511,606, Non-final Office Action, 4 pages, mailed Dec. 21, 2006.
Office action from U.S. Appl. No. 11/513,780 dated Jan. 27, 2011.
Response from U.S. Appl. No. 11/513,780 dated Apr. 27, 2011.
Office action from U.S. Appl. No. 11/513,780 dated Aug. 2, 2011.
U.S. Appl. No. 11/513,746, Non-final Office Action, 7 pages, mailed Jun. 26, 2008.
Response to Office action from U.S. Appl. No. 11/513,746 dated Oct. 27, 2008.
Office action from U.S. Appl. No. 11/513,746 dated Jan. 15, 2009.
Office action from U.S. Appl. No. 11/513,802 dated Aug. 7, 2009.
Response from U.S. Appl. No. 11/513,802 dated Dec. 3, 2009.
Office action from U.S. Appl. No. 11/513,802 dated Mar. 19, 2010.
Response from U.S. Appl. No. 11/513,802 dated Aug. 19, 2010.
Office action from U.S. Appl. No. 11/513,802 dated Oct. 6, 2010.
Response from U.S. Appl. No. 11/513,802 dated Feb. 4, 2011.
Office action from U.S. Appl. No. 11/513,802 dated Apr. 14, 2011.
Response from U.S. Appl. No. 11/513,802 dated Jul. 14, 2011.
Notice of Allowance from U.S. Appl. No. 11/513,802 dated Aug. 25, 2011.
Notice of Allowance from U.S. Appl. No. 11/513,802 dated Oct. 3, 2011.
Office action from U.S. Appl. No. 12/064,697 dated Jun. 22, 2011.
Amendment with Terminal Disclaimer from U.S. Appl. No. 12/064,697 dated Sep. 22, 2011.
Notice of Allowance from U.S. Appl. No. 12/064,697 dated Nov. 23, 2011.
Office action from Australian Application No. 2006284687 dated Jul. 26, 2011.
Asakawa et al., "Experiment on operating methods of an electric wheelchair for a system of detecting position and direction", Robotics and Biomimetics, ROBIO 2007, IEEE Int'l Conf on Digital Object Identifier, 10.1109/ROBIO.2007.4522345, pp. 1260-1265 (2007).
Barea, R., et al., "EOG guidance of a wheelchair using nerual networks", Proceedings 15th Intl Conf. on Pattern Recognition, vol. 4, Digital Object Identifier 10.1109/ICPR.2000.903006, pp. 668-671, published 2000.
Cooper et al., "Analysis of position and isometric joysticks for powered wheelchair driving", Biomedical Engineering, IEEE Transac-

(56) References Cited

OTHER PUBLICATIONS tions on Digital Object Identifier, vol. 47, issue 7, 10.1109/10. 846684, published 2000, pp. 902-910.
Jones et al., "Powered wheelchair driving performance using force- and position-sensing joysticks", Bioengineering Conference, Proceedings of the IEEE 24th Annual Northeast, Digital Object identifier, 10.1109/NEBC.1998.664901, pp. 130-132, published 1998.
Katsura et al., "Semiautonomous wheelchair based on quarry of environmental information", IEEE Translations on Industrial Electronics, vol. 53, issue 4, Digital Object Identifier 10.1109/TIE.2006. 878294, pp. 1373-1382, published 2006.
Sasaki et al., "Development of a new adaptation system for a manual wheelchair based on human body function", MHS '07 International Symposium on Micro-NanoMechatronics and Human Science, Digital Object Identifier, 10.1109/MHS.2007.4420902, pp. 478-484, published 2007.
Seong-Pal Kang, "A hand gesture controlled semi-autonomous wheelchair", IEEE/RSJ Intl Conf on Itelligent Robots and Systems, Digital Object Identifier: 10.1109/IROS.2004.1389968, pp. 3565-3570, vol. 4, published 2004.
Tanimoto et al., "Measurement of wheelchair position for analyzing transfer motion for SCI patient", Imaging Systems and Techniques, IST '07, IEEE International Workshop on Digital Object Identifier, 10.1009/IST.2007.379605, pp. 1-6, published 2007.
Dynamic, Actuator Remote Control Module DX-ARC5 Installation Manual, copyright Jun. 2004, 10 pgs.
Dynamic, DX Attendant Control Unit (ACU) Installation Manual, No. 60013, issue 4, Nov. 1998, 30 pgs.
Dynamic, DX Dolphin Remote (DX-Rem34) Installation Manual, No. 60025, issue 5, Jan. 1999, 69 pgs.
Dynamic, DX Power Module (PMB, PMB1, PMB2, PMB-S) Installation Manual, No. 63824, issue 2, Jul. 1998, 85 pgs.
Dynamic, DX Remote Joystick Module (RJM) Installation Manual, No. 60014, iss. 4, Apr. 1997, 13 pgs.
Dynamic, DX Two Actuator Module (TAM) Installation Manual, No. 60026, issue 5, Jul. 1998, 45 pgs.
Dynamic, DX-GB, The Complete Gearless Brushless DC Control System brochure, 2 pgs. (Applicant unable to determine date at this time—please consider document and if relied upon by Examiner, Applicant will endeavor to determine date).
Dynamic, DX-REMG90, DX-REMG90A, DX-REMG90T Master Remotes Installation Manual, GBK64048, issue 1, Jan. 2005, 61 pgs.
Flash, New and Notable Product Design, p. 28 from Design News Oct. 10, 2005.
Infineon Technologies, "XC164CS 16-Bit Single-Chip Microcontroller", Data Sheet, V2.1, Jun. 2003, 71 pgs.
Int'l App. No. PCT/US06/33963, International Search Report, mailed May 4, 2007, 3 pages.
Int'l App. No. PCT/US06/33963, Written Opinion of the International Searching Authority, mailed May 4, 2007, 6 pages.
Int'l App. No. PCT/US06/33964, International Search Report, mailed May 4, 2007, 3 pages.
Int'l App. No. PCT/US06/33964, Written Opinion of the International Searching Authority, mailed May 4, 2007, 10 pages.
Int'l App. No. PCT/US06/33971, International Search Report, mailed Mar. 9, 2007, 4 pages.
Int'l App. No. PCT/US06/33971, Written Opinion of the International Searching Authority, mailed Mar. 9, 2007, 6 pages.
Int'l App. No. PCT/US06/33973, International Search Report, mailed Mar. 16, 2007, 3 pages.
Int'l App. No. PCT/US06/33973, Written Opinion of the International Searching Authority, mailed Mar. 16, 2007, 5 pages.
Int'l App. No. PCT/US06/33978, International Search Report, mailed Jun. 5, 2007, 7 pages.
Int'l App. No. PCT/US06/33978, Invitation to Pay Additional Fees and Communication Relating to the Results of the Partial International Search, mailed Apr. 5, 2007, 8 pages.
Int'l App. No. PCT/US06/33978, Written Opinion of the International Searching Authority, mailed Jun. 5, 2007, 8 pages.
Int'l App. No. PCT/US06/34149, International Search Report, mailed Jun. 8, 2007, 3 pages.
Int'l App. No. PCT/US06/34149, Written Opinion of the International Searching Authority, mailed Jun. 8, 2007, 7 pages.
Invacare Corporation—Brochure—"Invacare Tarsys Series Powered Seating Systems", Form No. 00-313, rev. Sep. 2002, 16 pgs.
Invacare Corporation—Brochure—"Storm Series Power Wheelchairs including Fomula CG Powered Seating, MK6i Electronics", 16 pgs., 2006, Form No. 06-040.
Invacare Corporation—Brochure "Invacare Storm Series TDX Power Wheelchairs, including Formula Powered Seating", Form No. 03-018, rev. Jul. 2004, 32 pgs.
Invacare, Owner's Operator and Maintenance Manual, 3G Storm Series Wheelchair Bases, Arrow RWD, Torque SP RWD, Ranger X RWD, dated Jun. 30, 2006, 88 pgs., Part No. 1143151.
Invacare, Owner's Operator and Maintenance Manual, Formula, CG Powered Seating Tilt Only, 48 pgs., Part No. 1143155, dated Jun. 30, 2006.
Linak, Product Data Sheet, Actuator LA30, 8 pgs, Chapter 2.1, copyright May 2002.
Linak, Product Data Sheet, Actuator LA31, 8 pgs, Chapter 5.8.2, copyright May 2005.
MK5 Electronics Top 10 Application Features, 2005 Spring Update, 10 pgs (2005).
Paula, Taking sensors out of motors, Mechanical Engineering, The American Society of Mechanical Engineers, www.memagazine.org/backissues/january98/features/sensout/sensout.html, printed Aug. 16, 2006, 5 pgs (1998).
PG Drives Technology—R-Net Rehab-Powerchair Control System (Presentation), 30 pages (Applicant unable to determine date at this time—please consider document and if relied upon by Examiner, Applicant will endeavor to determine date).
QR-ED Owners's Manual, Quickie Enhanced Display, Sunrise Medical, Inc., Longmont,Colorado, 10519 Rev. A, 2006 (51 pages).
Quantum Rehab Innovative Rehab Solutions, a division of Pride Mobility Products Corp., one page brochure, Q-Logic Drive Control System, QLOGIC-Mar. 13, 2006.
Quantum Rehab Innovative Rehab Solutions, a division of Pride Mobility Products Group, Q controls, page from http://www.pridemobility.com/quantum/Electronics/Q_Controls/q_controls.html, printed Jun. 9, 2006, copyright 1995-2006.
Quickie HHP Programming Tree, Sunrise Medical, Inc., Longmont, Colorado (7 pages) (Applicant unable to determine date at this time—please consider document and if relied upon by Examiner, Applicant will endeavor to determine date).
Service Manual, Quickie Rhythm & Groove, Sunrise Medical, Inc., Longmont, Colorado, 014061 Rev. A, 2006 (104 pages).
Specialty Control Set Up & Programming Guide, QR-SCM Owner's Manual, Quickie Electronics Platform powered by Delphi, Sunrise Medical, Inc., Longmont, Colorado, 101748 Rev. A, 2006 (15 pages).
Examiner Initiated Interview Summary from U.S. Appl. No. 13/228,677 dated Jun. 5, 2012.
Notice of Allowance from U.S. Appl. No. 13/228,677 dated Jun. 5, 2012.
Response to Office Action from Australian Application No. 2006284749 dated Apr. 30, 2012.
Second Examination Report from New Zealand Application No. 591,831 dated Aug. 16, 2012.
Office Action from U.S. Appl. No. 13/430,011 dated Aug. 8, 2012.
Office action from U.S. Appl. No. 11/513,750 dated Nov. 23, 2009.
Response from U.S. Appl. No. 11/513,750 dated May 21, 2010.
Notice of Allowance from U.S. Appl. No. 11/513,750 dated Dec. 2, 2010.
Notice of Allowance from U.S. Appl. No. 11/513,750 dated Jan. 20, 2011.
Notice of Allowance from U.S. Appl. No. 11/513,750 dated May 5, 2011.
Notice of Allowance from U.S. Appl. No. 11/513,750 dated Oct. 12, 2011.
First Examiner's Report from Australia Patent Application No. 2009230975 dated Nov. 24, 2010.
Response from Australia Patent Application No. 2009230975 dated Nov. 30, 2011.

(56) References Cited

OTHER PUBLICATIONS

Office Action from U.S. Appl. No. 13/228,677 dated Feb. 2, 2012.
Final Office Action from U.S. Appl. No. 11/513,740 dated Apr. 13, 2012.
Response with RCE from U.S. Appl. No. 11/513,780 dated Feb. 2, 2012.
Office Action from U.S. Appl. No. 11/513,780 dated Mar. 30, 2012.
First Office Action from EP Application No. 06813984.9 dated Apr. 24, 2012.
Amendment from U.S. Appl. No. 13/228,677 dated May 2, 2012.
Response to Office Action from Australian Application No. 2006284741 dated May 17, 2012.
Exam Report from Australian Application No. 2006284748 dated Aug. 29, 2011.
Exam Report from Australian Application No. 2006284768 dated Aug. 24, 2011.
First Office Action from EP Application No. 06814005.2 dated Nov. 2, 2011.
Response from EP Application No. 06814005.2 dated May 4, 2012.
Supplemental Amendment from U.S. Appl. No. 13/228,677 dated May 30, 2012.
Statement of Substance of Interview from U.S. Appl. No. 11/513,740 dated Feb. 23, 2012.
Corrected Notice of Allowability for U.S. Appl. No. 13/430,011 dated Feb. 19, 2013.
First Office Action in CA Application No. 2,614,744 dated Feb. 1, 2013.
First Office Action from CA Application No. 2,615,084 dated Feb. 1, 2013.
First Office Action from CA Application No. 2,615,091 dated Jan. 30, 2013.
First Office Action from CA Application No. 2,614,752 dated Feb. 5, 2013.
First Office Action in CA Application No. 2,616,325 dated Feb. 4, 2013.
First Office Action in CA Application No. 2,616,332 dated Feb. 5, 2013.
Response to Office Action from AU Application No. 2006284747 dated Feb. 26, 2013.
First Office Action in CA Application No. 2,615,087 dated Mar. 1, 2013.
Office Action for U.S. Appl. No. 13/301,051 dated May 9, 2013.
Amendment to Office Action for U.S. Appl. No. 13/301,051 dated Aug. 9, 2013.
Final Office Action for U.S. Appl. No. 13/301,051 dated Aug. 29, 2013.
Response to Office Action for U.S. Appl. No. 13/311,140 dated Apr. 10, 2013.
Notice of Allowance from U.S. Appl. No. 13/311,140 dated May 15, 2013.
Ex Parte Quayle Action for U.S. Appl. No. 13/646,989 dated Jun. 27, 2013.
2nd Examination Report from AU Application No. 2006284747 dated Mar. 21, 2013.
Response to Office Action in AU Application No. 2006284753 dated Feb. 27, 2013.
Office Action in EP Application No. 06802770.5 dated Jul. 1, 2013.
2nd Office Action from EP Appl. No. 06814005.2 dated May 21, 2013.
Non Final Office Action for U.S. Appl. No. 13/301,061 dated Jul. 19, 2013.
Response to Office Action in CA Application No. 2,614,744 dated Aug. 1, 2013.
Amendment in CA Application No. 2,615,091 dated Jul. 30, 2013.
Amendment in CA Application No. 2,616,325 dated Aug. 6, 2013.
Response to Office Action in CA Application No. 2,616,332 dated Aug. 6, 2013.
Response to Office Action in CA Application No. 2,615,087 dated Aug. 6, 2013.
Response submitted in European Application No. 06802770.5 dated Nov. 11, 2013, 9 pgs.
US 8,538,599, 09/2013, Peters et al. (withdrawn)

* cited by examiner

POWER DRIVEN WHEELCHAIR

CROSS-REFERENCE TO RELATED APPLICATIONS

This application is a continuation of Ser. No. 11/513,802, filed Aug. 31, 2006, titled POWER DRIVEN WHEELCHAIR, which claims the benefit of eight U.S. provisional patent applications, including Ser. No. 60/712,987, filed Aug. 31, 2005, Ser. No. 60/727,005, filed Oct. 15, 2005, Ser. No. 60/726,983, filed Oct. 15, 2005, Ser. No. 60/726,666, filed Oct. 15, 2005, Ser. No. 60/726,981, filed Oct. 15, 2005, Ser. No. 60/726,993, filed Oct. 15, 2005, Ser. No. 60/727,249, filed Oct. 15, 2005, and Ser. No. 60/727,250, filed Oct. 15, 2005. This application is also related to seven co-pending U.S. utility patent applications filed the same day as this application, including Ser. No. 11/513,740, filed Aug. 31, 2006 entitled "Mode Programmable Actuator Controller for Power Positioning Seat or Leg Support of a Wheelchair," Ser. No. 11/514,016, filed Aug. 31, 2006 entitled "Method and Apparatus for Setting or Modifying Programmable Parameter in Power Driven Wheelchair," Ser. No. 11/513,854, filed Aug. 31, 2006 entitled "Context-Sensitive Help for Display Device Associated with Power Driven Wheelchair," Ser. No. 11/511,606, filed Aug. 29, 2006 entitled "Method and Apparatus for Programming Parameters of a Power Driven Wheelchair for a Plurality of Drive Settings," Ser. No. 11/513,780, filed Aug. 31, 2006 entitled "Adjustable Mount for Controller of Power Driven Wheelchair," Ser. No. 11/513,746, filed Aug. 31, 2006 entitled "Method and Apparatus for Automated Positioning of User Support Surfaces in Power Driven Wheelchair," and Ser. No. 11/513,750, filed Aug. 31, 2006 entitled "Method and Apparatus for Improved Support of Power Driven Wheelchair." The contents of all above-identified patent application(s) and patent(s) are fully incorporated herein by reference.

BACKGROUND

Power driven wheelchairs generally include right and left drive wheels driven by a motor controller via corresponding right and left drive motors. A power driven wheelchair may also include actuators, motors, or other devices to control user support surfaces, such as seats, backs, leg rests, foot rests, or head rests. These various actuators, motors, and other devices are typically controlled via a user interface. The user interface may include input devices, such as a joystick, pushbuttons and other types of switches, potentiometers, and other types of control devices, and output devices, such as a graphic display, alphanumeric display, or indicators. Input devices for special needs users, such as a proportional head control, a sip n' puff system, a fiber optic tray array, a proximity head array, or a proximity switch array, may also be provided as a user interface or as a remote input to the user interface.

Examples of power driven wheelchairs are provided in a product brochure entitled "Invacare® Storm® Series TDX™ Power Wheelchairs, including Formula™ Powered Seating," Form No. 03-018, 2004 from Invacare Corporation of Elyria, Ohio, the contents of which are fully incorporated herein by reference. Additional examples of power driven wheelchairs are provided in another product brochure entitled "Invacare® Tarsys® Series Powered Seating System," Form No. 00-313, 2002 from Invacare Corporation, the contents of which are fully incorporated herein by reference.

Currently, a separate remote programmer unit may be used to set or modify programmable parameters associated with operation and support of a given power driven wheelchair. Examples of remote programmers and their use in conjunction with a power driven wheelchair are provided in U.S. Pat. No. 6,871,122 to Wakefield, II and U.S. Pat. No. 6,819,981 to Wakefield, II et al., both assigned to Invacare Corporation. The contents of both of these patents are fully incorporated herein by reference.

SUMMARY

In one aspect, a power driven wheelchair is provided. In one embodiment, the power driven wheelchair includes: a system controller including a main controller, a storage device in operative communication with the main controller, and at least one input device in operative communication with the main controller and a first motor assembly in operative communication with the system controller via a common bus, the first motor assembly including a first drive motor, a first local controller in operative communication with the first drive motor, and a first sensor sensing a condition associated with the first drive motor and in operative communication with the first local controller.

In another embodiment, in place of the first motor assembly, the power driven wheelchair includes: a first actuator assembly in operative communication with the system controller via a common bus, the first actuator assembly including a first actuator mechanism, a first local controller in operative communication with the first actuator mechanism, and a first sensor sensing a condition associated with the first actuator mechanism and in operative communication with the first local controller.

In another aspect, a method of operating a power driven wheelchair is provided. In one embodiment, the method includes: a) activating an input device associated with a system controller, b) selecting one or more operating parameters from a plurality of programmable operating parameters based at least in part on the input device activation, c) transmitting at least one of the selected operating parameters from the system controller to a first motor assembly in a first message via a common bus, the first motor assembly including a first drive motor, a first local controller in operative communication with the first drive motor, and a first sensor sensing a condition associated with the first drive motor and in operative communication with the first local controller, and d) controlling the first drive motor via the first local controller in response to operating parameters received by the first motor assembly and in relation to the condition sensed by the first sensor.

In another embodiment, the method includes: a) and b) as stated above along with c) transmitting at least one of the selected operating parameters from the system controller to a first actuator assembly in a first message via a common bus, the first actuator assembly including a first actuator mechanism, a first local controller in operative communication with the first actuator mechanism, and a first sensor sensing a condition associated with the first actuator mechanism and in operative communication with the first local controller and d) controlling the first actuator mechanism via the first local controller in response to operating parameters received by the first actuator assembly and in relation to the condition sensed by the first sensor.

BRIEF DESCRIPTION OF THE DRAWINGS

These and other features, aspects, and advantages of the present invention will become better understood with regard to the accompanying drawings, following description, and appended claims.

DETAILED DESCRIPTION

Figure 1:
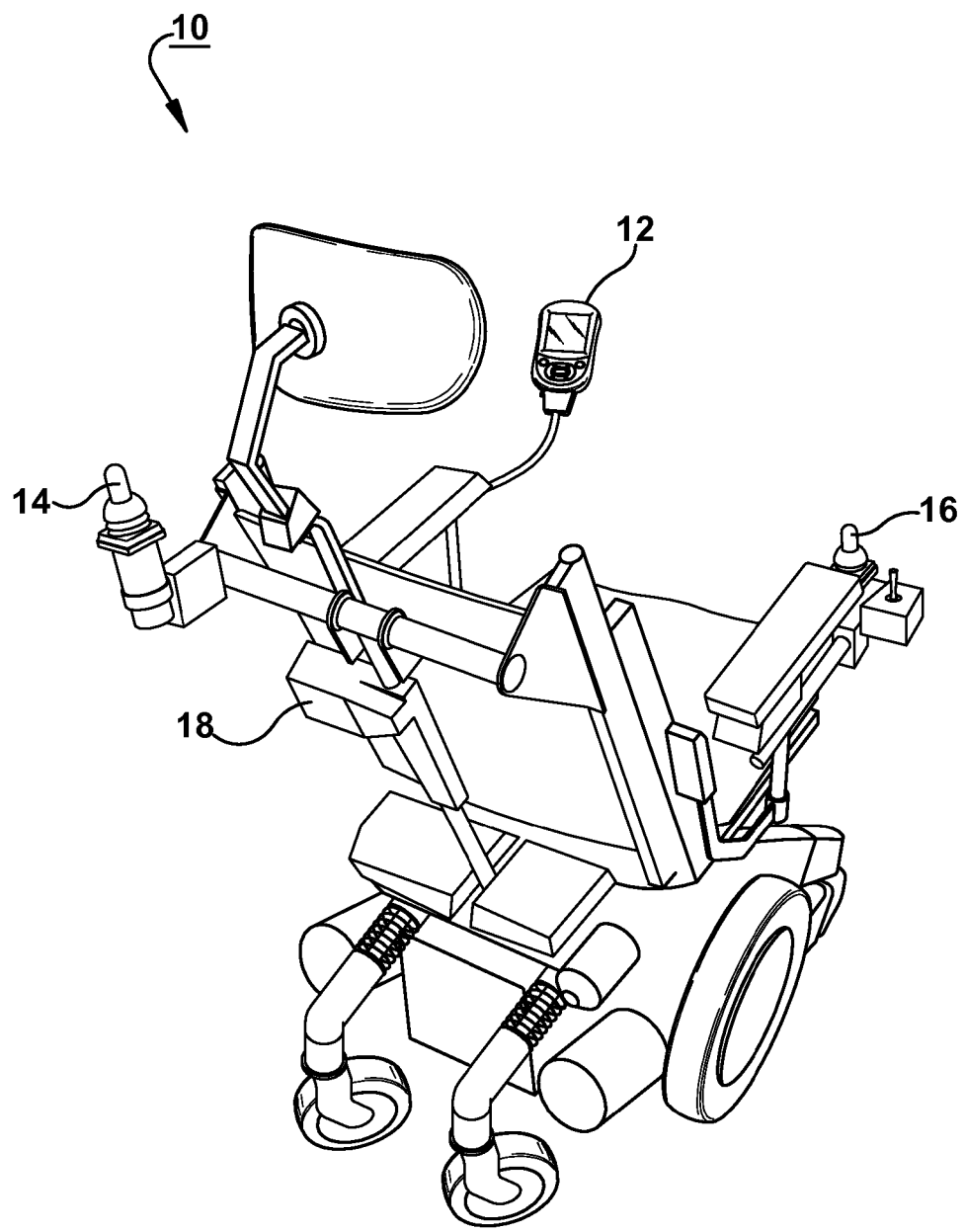
FIG. 1 shows an exemplary embodiment of a power driven wheelchair.

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more enumerated elements or method steps.

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. As used herein, "logic" is considered synonymous with "circuit."

"Measurement," as used herein includes, but is not limited to, an extent, magnitude, size, capacity, amount, dimension, characteristic or quantity ascertained by measuring. Example measurements are provided, but such examples are not intended to limit the scope of measurements the systems and methods described herein can employ.

"Operative communication," as used herein includes, but is not limited to, a communicative relationship between devices, logic, or circuits, including mechanical and pneumatic relationships. Direct electrical, electromagnetic, and optical connections and indirect electrical, electromagnetic, and optical connections are examples of such communications. Linkages, gears, chains, push rods, cams, keys, attaching hardware, and other components facilitating mechanical connections are also examples of such communications. Pneumatic devices and interconnecting pneumatic tubing may also contribute to operative communications. Two devices are in operative communication if an action from one causes an effect in the other, regardless of whether the action is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or' is used to describe a list of alternative things in which one may choose one option or any combination of alternative options. For example, "A or B" means "A or B or both" and "A, B, or C" means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combination of alternatives are not included in the choices associated with the list.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

With reference to FIG. 1, an exemplary embodiment of a power driven wheelchair 10 may include a system controller 12, an intelligent proportional attendant control 14, an intelligent compact joystick 16, and an intelligent actuator 18. Various physical and functional characteristics of the power driven wheelchair 10 and other embodiments of power driven wheelchairs described herein are disclosed in eight U.S. provisional patent applications incorporated by reference above, including Ser. Nos. 60/712,987, 60/727,005, 60/726,983, 60/726,666, 60/726,981, 60/726,993, 60/727,249, and 60/727,250. Hereinafter, this document may refer to these eight applications collectively as "the eight applications incorporated by reference." Individually, these applications may be referred to in this document as the '987 application, '005 application, '983 application, '666 application, '981 application, '993 application, '249 application, and '250 application, respectively, in conjunction with the serial number assigned to the corresponding application.

The system controller 12 and intelligent compact joystick 16 may provide a person sitting in the seat of the power driven wheelchair 10 with a user interface to control operation. The intelligent proportional attendant control 14 may provide a person, such as an attendant, positioned at the rear of the power driven wheelchair 10 with a user interface to control operation. Various user interfaces of the power driven wheelchair 10 may be used to move user support surfaces associated with powered seating to desired positions. During powered seating operation, the system controller 12 may command the intelligent actuator 18 to move the user support surface to the desired position. The eight applications incorporated by reference describe optional components and additional embodiments for power driven wheelchairs and associated components which also apply to the power driven wheelchair 10 of FIG. 1.

Figure 2:
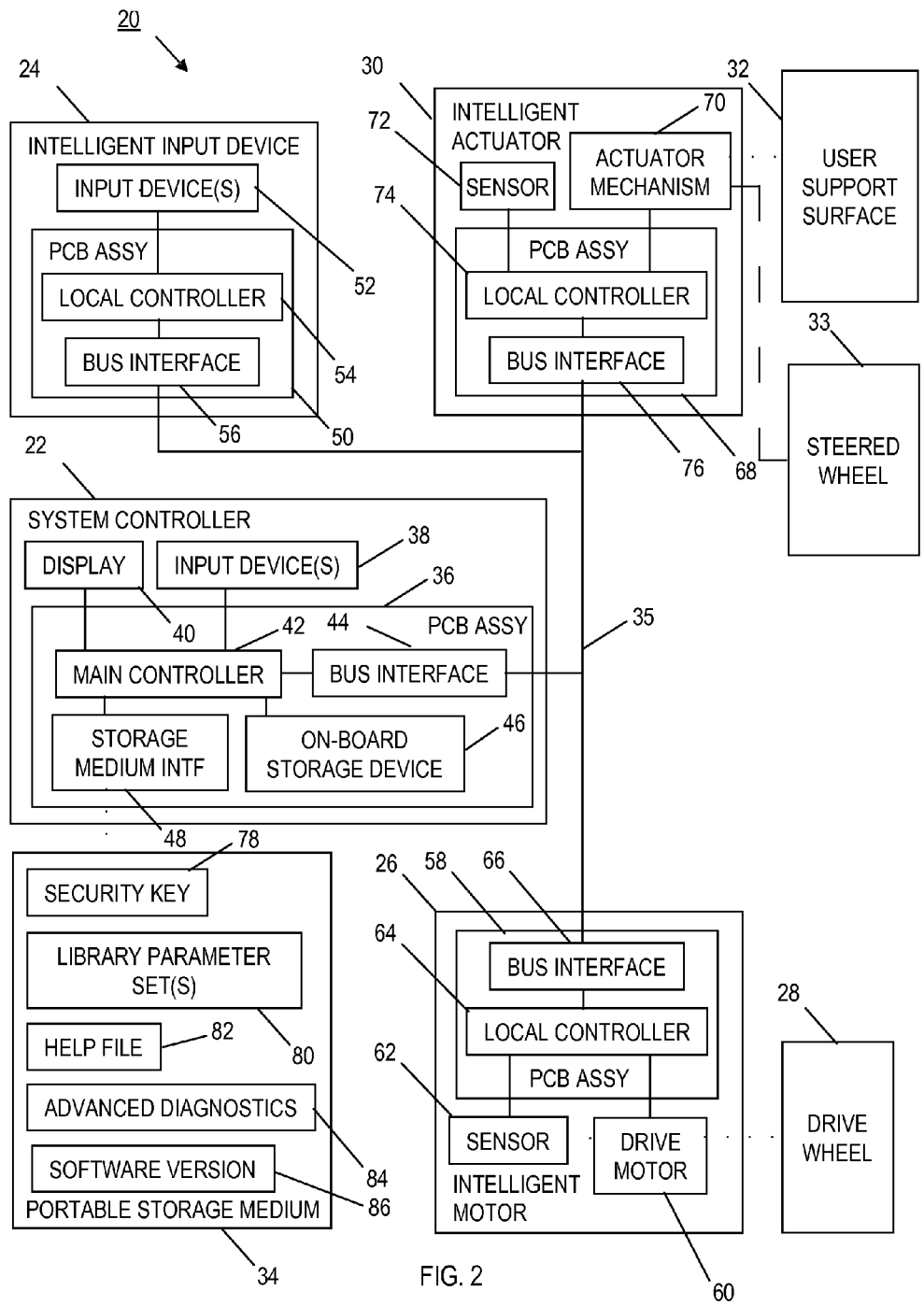
FIG. 2 is a block diagram of an exemplary embodiment of a power driven wheelchair.

With reference to FIG. 2, an exemplary embodiment of a control system for a power driven wheelchair 20 is depicted in block diagram fashion. As shown, the control system for the power driven wheelchair 20 may include a system controller 22, an intelligent input device 24, an intelligent motor 26, a drive wheel 28, an intelligent actuator 30, a user support surface 32, a steered wheel 33, a portable storage medium 34, and a common bus 35. The steered wheel 33 is optional and not required in power driven wheelchairs that use differential drive of multiple drive motors for steering.

The common bus 35 is representative of a communication bus suitable for interfacing a plurality of components of the control system for the power driven wheelchair 20. In various embodiments, the common bus 35 may include a serial bus, a parallel bus, a communication network, or combinations thereof. For example, the common bus 35 may include a serial bus, such as a controller area network (CAN) bus.

The system controller 22, for example, is representative of various system controller models with joystick controls. The system controller 22 may include a printed circuit board (PCB) assembly 36, one or more input devices 38, and a display 40. The one or more input devices 38, for example, may include a proportional analog joystick, a three position toggle or rotary switch, a return-to-center momentary three position switch, a rotary potentiometer, and a plurality of momentary pushbuttons. In additional embodiments, the one or more input devices 38, may include other types of joysticks, switches, potentiometers, pushbuttons, or other types of control devices. The display 40, for example, may include a 128×64 pixel graphic display or a 160×160 pixel graphic display. In additional embodiments, the display may include a graphic display in a different size or a different arrangement of pixels, an alphanumeric display, or another type of display. Moreover, the display 40 may include one or more indicators, such as light emitting diodes (LEDs), lamps, other types of visual indicators, or audible devices.

The PCB assembly 36 may include a main controller 42, a bus interface 44, an on-board storage device 46, and a storage medium interface 48. The main controller 42, for example, may include a microcontroller, a central processing unit (CPU), or another type of controller suitable for main control of the control system for the power driven wheelchair 20. For example, in one embodiment, the main controller 42 may include an SAF-XC164CS 16-bit single-chip microcontroller by Infineon Technologies of München, Germany. The bus interface 44 makes the system controller 22 compatible with messages communicated via the common bus 35. For example, the system controller 22 may send messages to other devices connected to the common bus 35 via the bus interface 44 and may receive messages from such devices. Messages, for example, may include commands, desired operating parameters, status information, or a combination thereof.

The on-board storage device 46 may include a volatile storage device, such as random access memory (RAM), and a non-volatile storage device, such as non-volatile memory, a fixed disk device, a removable disc device, an optical storage device, etc. Non-volatile memory, for example, may include read-only memory (ROM), programmable read-only memory (PROM), erasable programmable read only memory (EPROM) electrically erasable programmable read only memory (EEPROM), or flash memory. For example, software programs, one or more programmable parameter set, and help information may be stored in one or more non-volatile memory storage devices associated with the on-board storage device 46. Each programmable parameter set may include a plurality of programmable operating parameters for operation of the power driven wheelchair. The main controller 42 may run the software programs and may control the display 40 and various devices connected to the common bus 35 based, at least in part, on one or more of the programmable operating parameters.

The portable storage medium 34 may include a plurality of storage locations which may store a security key 78, one or more library parameter sets 80, a help file 82, advanced diagnostics information 84, and one or more software version 86. The portable storage medium 34 described herein may be an optional accessory or special tool for dealers or technicians. In some cases, the portable storage medium 34 may also be used in conjunction with normal operation of the power driven wheelchair by its owner or end user. The portable storage medium 34 described herein may be suitable for use on various models and configurations of power driven wheelchairs. However, in another scheme for protection and security of the information stored therein, a given portable storage medium 34 may be serialized or otherwise tailored and keyed to an individual system controller 22 and corresponding power driven wheelchair. Communication between the main controller 42 and the portable storage medium 34 is via the storage medium interface 48.

The portable storage medium 34 may include a non-volatile storage medium, such as non-volatile memory. In one embodiment, the portable storage medium 34 may include, for example, a type of removable storage medium known as a removable memory card. For example, the portable storage medium 34 may include a secure digital (SD) card. In the embodiment being described, the storage medium interface 48 may include, for example, a corresponding removable memory interface (e.g., an SD card reader) to communicate and exchange information with the main controller 42.

In additional embodiments, the portable storage medium 48 may include other types of removable memory, such as a compact flash (CF) card, a flash memory pen drive, a memory stick, a microdrive, a multimedia memory card (MMC), a smart media (SM) card, an xD picture card, a subscriber identity module (SIM) card, a memory chip (e.g., ROM, PROM, EPROM, EEPROM), or another suitable form of removable, separable, or detachable memory. In other additional embodiments, the portable storage medium may include other forms of removable storage medium, such as optical discs (e.g., compact discs (CDs), digital video discs (DVDs)) or floppy disks (e.g., zip disks).

In still further embodiments, the portable storage medium 48 may include a portable storage device, such as an external memory card reader, an external optical disc drive, an external floppy disk drive, a portable computer (e.g., laptops, notebooks, personal digital assistants (PDAs)), a mobile telephone (e.g., cellular telephone, personal communication system, satellite telephone), a digital camera, an MP3 player, or any type of portable storage device capable of wired or wireless communication with another compatible communication device.

The storage medium interface 48, for example, includes a connector or socket that mates with the portable storage medium 34 and an electronic circuit that supports communication between the main controller 42 and the portable storage medium 34. For example, the storage medium interface 48 may include a memory card reader, a memory chip socket, an optical disc drive, a floppy disk drive, a serial port (e.g., universal serial bus (USB) port, RS-232), a parallel port (e.g., small computer system interface (SCSI) port), a modem, an Ethernet port, a wireless Ethernet transceiver (e.g., IEEE 802.11b), a Bluetooth transceiver, an infrared (IR) transceiver, a radio frequency (RF) transceiver, a mobile telephone interface, a cable television interface, a satellite television interface, or any communication device capable of wired or wireless communication with a corresponding portable storage medium.

The intelligent input device 24, for example, is representative of a remote input device that works in conjunction with the system controller 22. The control system for the power driven wheelchair 20 may include multiple intelligent input devices 24. The intelligent input device 24 may include a PCB assembly 50 and one or more input devices 52. The PCB assembly 50 and one or more input devices 52 may be packaged within a common enclosure or may be otherwise assembled to form the intelligent input device 24. The one or more input devices 52 have the same characteristics as described above for the one or more input devices 38 of the system controller 22. The PCB assembly 50 may include a local controller 54 and a bus interface 56. The local controller 54 may detect activations of the one or more input devices 52, construct one or more messages based at least in part on such activations, and communicate such messages, for example, to the system controller 22 via the bus interface 56. The bus interface 56 generally has the characteristics described above for the bus interface 44 of the system controller 22.

The intelligent motor 26 and drive wheel 28, for example, are exemplary of one or more intelligent motors 26 and one or more drive wheels 28. The power driven wheelchair may include various configurations of intelligent motors 26 and drive wheels 28. The power driven wheelchair may also include various configurations of castor wheels or steered wheels 33 in conjunction with a particular configuration of intelligent motors 26 and drive wheels 28. Overall, the power driven wheelchair may include three or more wheels, including at least one drive wheel. Otherwise, the wheels may be the same type or a suitable combination of various types. If the power driven wheelchair includes two drive wheels that are independently drive, steering may be accomplished through differential speed and direction of the drive wheels and a steered wheel is not required.

For example, in one embodiment, the power driven wheelchair may include left and right intelligent motors 26, each mechanically linked to corresponding left and right drive wheels 28. This embodiment may also include one or more castor wheels. In one arrangement, the left and right drive wheels 28 may be toward the rear of the power driven wheelchair and two castor wheels may be toward the front. In another arrangement, the left and right drive wheels 28 may be toward the center, two castor wheels may be toward the rear, and two additional castor wheels may be toward the front. In still another arrangement, the left and right drive wheels 28 may be toward the front and two castor wheels may be toward the rear. Steering in configurations with independently-controlled left and right drive wheels 28 may be accomplished by differential control of corresponding intelligent motors 26 with respect to different speed, direction, or combinations thereof.

In another embodiment, the power driven wheelchair may include one intelligent motor 26 mechanically linked to one or more drive wheels 28. This embodiment may also include one or more steered wheels 33. Additionally, this configuration may also include one or more castor wheels. In one arrangement, two drive wheels 28 may be toward the rear of the power driven wheelchair and two steered wheels 33 may be toward the front. In another arrangement, the two drive wheels 28 may be toward the front and the two steered wheels 33 may be toward the rear. The steered wheels 33 may be controlled independently or in tandem via a suitable mechanical linkage. Steering the power driven wheelchair may be accomplished by controlling an actuator mechanism to adjust an angular position of the steered wheel(s) relative to a vertical axis. For example, in configurations with a single intelligent motor 26, steering may be accomplished by controlling an actuator mechanism to adjust an angular position of one or more steered wheels relative to a vertical axis. Control of the actuator mechanism for steering being separate and distinct from control of the intelligent motor 26.

In still another embodiment, the power driven wheelchair may include three or more intelligent motors 26, each mechanically linked to corresponding drive wheels 28. This embodiment may also include one or more castor wheels.

In the various configurations of the power driven wheelchair and arrangements of components described above, a drive wheel 28 may also be steered through various control schemes. In other words, it is envisioned that the drive wheel 28 and the steered wheel 33 may actually refer to the same wheel through proper arrangement of components and implementation of control schemes. For additional information on controlling steering in this manner and in other configurations of the power driven wheelchair described above, see U.S. Pat. No. 5,547,038 to Madwed. The contents of the Madwed patent document is fully incorporated herein by reference.

The intelligent motor 26 may include a PCB assembly 58, a drive motor 60, and one or more sensors 62. The PCB assembly 58, drive motor 60, and one or more sensors 62 may be packaged within a common enclosure or may be otherwise assembled to form the intelligent motor 26. The PCB assembly 58 may include a local controller 64 and a bus interface 66. The bus interface 66 generally has the same characteristics described above for the bus interface 44 of the system controller 22. The bus interface 66 may receive messages, for example, from the system controller 22. Messages received from the system controller 22, for example, may include commands, desired operating parameters, or a combination thereof. For example, certain commands or desired operating parameters in messages to the intelligent motor 26 may identify desired direction, desired speed, desired acceleration, or a desired operating profile. The local controller 64 may provide local closed-loop control of the drive motor 60 in conjunction with commands or operating parameters from the system controller 22 and feedback from the one or more sensors 62. The local controller 64 may provide status information in messages to the system controller 22 in conjunction with, for example, achievement of desired operating parameters.

The drive motor 60, for example, may include a 2-pole motor, a 4-pole motor, a 4-pole motor with feedback, or a gearless brushless motor. The drive motor 60 may also include a permanent magnet motor, a brushless motor, a shunt-wound field motor, a series-wound field motor, or a compound-wound field motor. Additionally, the drive motor 60 may include a direct current (DC) motor, an alternating current (AC) motor, a 3-phase motor, a multi-phase motor, or a reversible motor. A specific type of motor may have characteristics associated with a combination of these various types of motors. For example, a particular DC motor may also be brushless, multi-phase, and reversible and may include permanent magnets.

The drive motor 60 may mechanically interface with the drive wheel 28 directly, via a gearbox assembly, or via another suitable drive train. In another embodiment, the drive motor 60 may mechanically interface with multiple drive wheels 28 directly, via a gearbox assembly, or via another suitable drive train. The power driven wheelchair may include multiple intelligent motors 26. Any combination of multiple intelligent motors 26 may be combined in the power driven wheelchair. For example, a first intelligent motor 26 may mechanically interface with one drive wheel 28 and a second intelligent motor 26 may mechanically interface with two or more drive wheels 28.

The one or more sensors 62 may include any combination of various types of sensors suitable for measuring or detecting characteristics of the drive motor 60 to provide feedback of actual conditions for comparison to desired conditions associated with the commands or operating parameters. For example, motor voltage, current, speed, or acceleration may be monitored. The polarity of the sensed signal, for example, may be monitored to detect direction.

The intelligent actuator 30 may include various types of actuator mechanisms, such as a stepper motor, a linear motor, a servo-motor, or another suitable device associated with position control. The power driven wheelchair may include multiple intelligent actuators 30. Moreover, in addition to controlling user support surfaces, intelligent actuators 30 may also be used to control other aspects of the power driven wheelchair, such as steered wheels 33, ventilator trays, etc.

The intelligent actuator 30 may include a PCB assembly 68, an actuator mechanism 70, and one or more sensors 72. The PCB assembly 68, actuator mechanism 70, and one or more sensors 72 may be packaged within a common enclosure or may be otherwise assembled to form the intelligent actuator 30. The PCB assembly 68 may include a local controller 74 and a bus interface 76. The bus interface 76 generally has the characteristics described above for the bus interface 44 of the system controller 22. The bus interface 76 may receive messages, for example, from the system controller 22. The messages, for example, may include commands, desired operating parameters, or a combination thereof. For example, certain commands or desired operating parameters in messages to the intelligent actuator 30 may identify desired position, desired speed, desired acceleration, or a desired operating profile. The local controller 74 may provide local closed-loop control of the actuator mechanism 70 in conjunction with commands or operating parameters from the system controller 22 and feedback from the one or more sensors 72. The local controller 74 may provide status information in messages to the system controller 22 in conjunction with, for example, achievement of desired operating parameters.

The actuator mechanism 70, for example, may include a stepper motor, a linear motor, a servo motor, or another suitable device associated with position control. The actuator mechanism 70, for example, may mechanically interface with the user support surface 32 or the steered wheel 33 via a suitable linkage, drive train, coupling, or another suitable arrangement of components enabling positional movement of the desired component in response to positional movement of the actuator mechanism 70. In another embodiment, the actuator mechanism 70 may mechanically interface with multiple user support surfaces 32 or multiple steered wheels 33. The user support surfaces 32 may be associated with a powered seat or a powered front rigging in the power driven wheelchair.

The user support surfaces 32 associated with the powered seat may include a seat support, a back support, and an articulating ventilator tray. The powered seat may be adjusted in a tilt position by moving the seat and back supports. This may provide pressure relief to the user. The powered seat may also be adjusted in a recline position by moving the back support. This may make it easier for the user to breath. The powered seat may be adjusted in a horizontal position by moving the seat and back supports. This may improve stability of the power driven wheelchair by positioning the user in relation to a desired center of gravity. The position of the ventilator tray may be adjusted in relation to a tilt or recline position, for example, to improve stability of breathing gas equipment positioned on the tray.

The user support surfaces 32 may also be associated with a powered front rigging that can include a common (i.e., left and right) leg rest and a common (i.e., left and right) foot rest. In this embodiment, the powered front rigging may be adjusted by pivoting the common leg rest to change the position of the user's lower legs in relation to the thighs. This may provide pressure relief to the user. The powered front rigging may also be adjusted by raising or lowering the common foot rest. This may make it easier for the user to transfer to or from the power driven wheelchair.

In another embodiment, the powered front rigging may include a right leg rest, a left leg rest, a right foot rest, and a left foot rest. In this embodiment, the powered front rigging may be adjusted by pivoting the right leg rest to change the position of the user's right lower leg in relation to the right thigh. This may provide pressure relief to the user. The powered front rigging may also be adjusted by pivoting the left leg rest to change the position of the user's left lower leg in relation to the left thigh. This may also provide pressure relief to the user. The powered front rigging may be adjusted by raising or lowering the right foot rest. This may make the power driven wheelchair fit the user better during normal operation. The powered front rigging may also be adjusted by raising or lowering the left foot rest. This may also make the power driven wheelchair fit the user better during normal operation.

The one or more sensors 72 may include any combination of various types of sensors suitable for measuring or detecting characteristics of the actuator mechanism 70 to provide feedback of actual conditions for comparison to desired conditions associated with the commands or operating parameters. For example, actuator position, speed, or acceleration may be monitored. The polarity of the sensed signal, for example, may be monitored to detect direction.

The power driven wheelchair may include multiple intelligent actuators 30. Any combination of multiple intelligent actuators 30 may be combined in the power driven wheelchair. For example, a first intelligent actuator 30 may mechanically interface with the powered seat to control the tilt position, a second intelligent actuator 30 may mechanically interface with the powered seat to control elevation, and a third intelligent actuator 30 may mechanically interface with one or more steered wheels 33.

The configuration depicted in FIG. 2 can perform normal and support operations associated with the power driven wheelchair using the system controller 22, including the various features provided under programming mode. The '983, '005, '981, '666, and '249 applications identified and incorporated by reference above describe optional components and additional embodiments for power driven wheelchairs and associated components which also apply to the power driven wheelchair and associated components of FIG. 2. The various aspects of FIG. 2 described above may be implemented through hardware, software, firmware, or combinations thereof.

Figure 3:
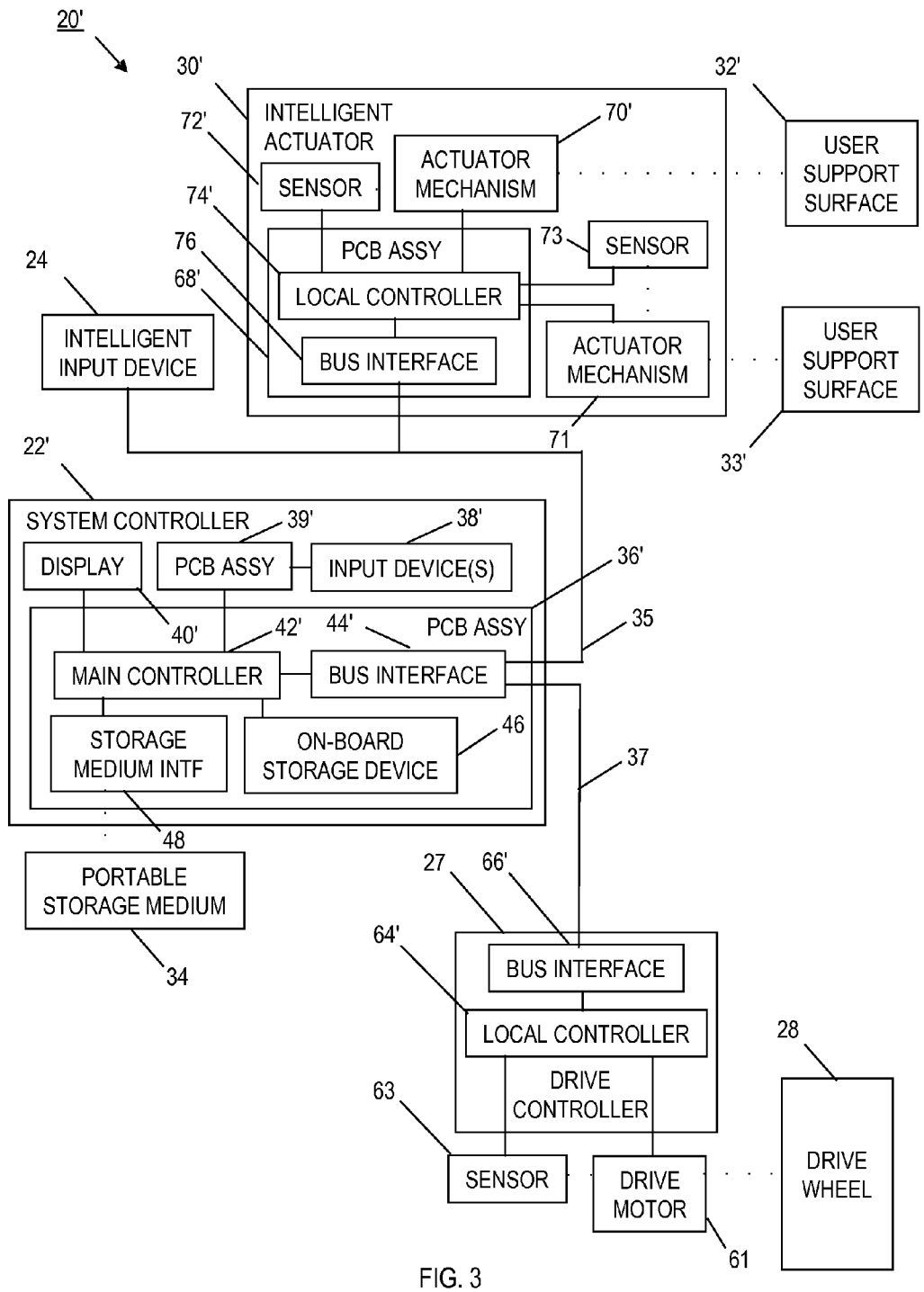
FIG. 3 is a block diagram of another exemplary embodiment of a power driven wheelchair.

With reference to FIG. 3, an exemplary embodiment of a control system for a power driven wheelchair 20' is depicted in block diagram fashion. As shown, the control system for the power driven wheelchair 20' may include a system controller 22', an intelligent input device 24, a drive controller 27, two drive wheels 28, an intelligent actuator 30', a first user support surface 32', a second user support surface 33', a portable storage medium 34, a common bus 35, a second bus 37, two drive motors 61, and one or more sensors 63 associated with each drive motor 61. The intelligent input device 24, two drive wheels 28, portable storage medium 34, and common bus 35 have the same characteristics as described above for the control system for the power driven wheelchair 20 of FIG. 2. The first user support surface 32' and second user support surface 33' generally have the characteristics described above for the user support surface 32 of FIG. 2. The two drive motors 61 both generally have the characteristics described above for the drive motor 60 of FIG. 2. The one or more sensors 63 generally have the characteristics described above for the one or more sensors 62 of FIG. 2.

With continued reference to FIG. 3, the second bus 37 is representative of a communication bus suitable for interfacing the drive controller 27 to the system controller 22'. In various embodiments, the second bus 37 may include a serial bus, a parallel bus, a communication network, or combinations thereof. For example, the second bus 37 may include a Shark serial communication bus, developed by Dynamic Controls of New Zealand.

The system controller 22', for example, is representative of a system controller model without a joystick. This may be referred to as a DISPLAY model system controller. The system controller 22' may include a first PCB assembly 36', one or more input devices 38', a second PCB assembly 39', and a display 40'. The one or more input devices 38' generally have the characteristics described above for the one or more input devices 38 of FIG. 2. The display 40' generally has the characteristics described above for the display 40 of FIG. 2. The second PCB assembly 39' interfaces the one or more input devices 38' to the first PCB assembly 36'.

The first PCB assembly 36' may include a main controller 42', a bus interface 44', an on-board storage device 46, and a storage medium interface 48. The on-board storage device 46 and storage medium interface 48 have the same characteristics as described above for the control system for the power driven wheelchair 20 of FIG. 2. The main controller 42' generally has the characteristics described above for the main controller 42 of FIG. 2. The bus interface 44' makes the system controller 22' compatible with messages communicated via both the common bus 35 and the second bus 37. For example, the system controller 22 may send messages to other devices connected to the common bus 35 via the bus interface 44' and may receive messages from such devices. Similarly, the system controller 22 may send messages to the drive controller 27 via the bus interface 44' and second bus 35 and may receive messages from the drive controller 27.

The drive controller 27 is representative of a drive controller that independently controls two drive wheels 28 via two corresponding drive motors 61. The power driven wheelchair may include various arrangements of two drive wheels 28, steered wheels, and castor wheels as described above in conjunction with FIG. 2 for configurations with two independently controlled drive wheels. In other embodiments, the drive controller 27 may control more or less drive wheels independently or in combination via more or less drive motors.

The drive controller 27 may include a local controller 64' and a bus interface 66'. The bus interface 66' makes the drive controller 27 compatible with messages communicated via the second bus 37. The bus interface 66' may receive messages, for example, from the system controller 22'. The messages, for example, may include commands directing control of the local controller 64'. The local controller 64' may control the drive motors 61 in accordance with messages from the system controller 22' and may, in turn, provide sensed operating characteristics from the one or more sensors 63 in messages to the system controller 22'.

The intelligent actuator 30' is representative of a dual intelligent actuator which, for example, controls two actuator mechanisms for positioning two different user support surfaces, such as left and right leg rests (e.g., 32', 33'). The power driven wheelchair may include multiple dual intelligent actuators 30'. Additionally, the power driven wheelchair may include one or more single intelligent actuator 30 (FIG. 2) in combination with one or more dual intelligent actuator 30'. Moreover, in addition to controlling user support surfaces, intelligent actuators 30' may also be used to control other aspects of the power driven wheelchairs, such as steered wheels 33 (FIG. 2), ventilator trays, etc.

The intelligent actuator 30' may include a PCB assembly 68', a first actuator mechanism 70', a second actuator mechanism 71, one or more sensors 72' associated with the first actuator mechanism, and one or more sensors 73 associated with the second actuator mechanism. The PCB assembly 68', first and second actuator mechanisms 70', 71, and sensors 72', 73 may be packaged within a common enclosure or may be otherwise assembled to form the intelligent actuator 30'. The PCB assembly 68' may include a local controller 74' and a bus interface 76. The bus interface 76 generally has the characteristics described above for the bus interface 44 of the system controller 22 (FIG. 2). The bus interface 76 may receive messages, for example, from the system controller 22'. The messages, for example, may include commands, desired operating parameters, or a combination thereof. For example, certain commands or desired operating parameters in messages to the intelligent actuator 30' may identify desired position, desired speed, desired acceleration, or a desired operating profile for the first user support surface 32', second user support surface 33', or both user support surfaces. For example, the local controller 74' may provide local closed-loop control of the first actuator mechanism 70' in conjunction with commands or operating parameters from the system controller 22' and feedback from the one or more sensors 72'. Similarly, the local controller 74' may provide local closed-loop control of the second actuator mechanism 70' in conjunction with commands or operating parameters from the system controller 22' and feedback from the one or more sensors 72'.

When the system controller 22' commands both first and second actuator mechanisms 70', 71 to be activated, the local controller 74' may activate them concurrently or individually, in a coordinated fashion. Of course, the system controller 22' may command either actuator mechanism 70', 71 to be activated while the other actuator mechanism is stationary. The local controller 74' may provide status information in messages to the system controller 22' in conjunction with, for example, achievement of desired operating parameters.

The actuator mechanisms 70', 71 may include various types of actuator mechanisms, such as a stepper motor, a linear motor, a servo motor, or another suitable device associated with position control, in any suitable combination. Each actuator mechanism 70', 71, for example, may mechanically interface with, for example, the corresponding user support surface 32', 33' via a suitable linkage, drive train, coupling, or another suitable arrangement of components enabling positional movement of the desired component in response to positional movement of the corresponding actuator mechanism 70', 71. In another embodiment, either actuator mechanism 70', 71 may mechanically interface with multiple user support surfaces. The user support surfaces 32', 33' may be associated with a powered seat or a powered front rigging in the power driven wheelchair. Accordingly, the user support surface 32', 33' may be any suitable combination of the various types of user support surfaces 32 in the powered seat and powered front rigging described above for FIG. 2.

The configuration depicted in FIG. 3 can perform normal and support operations associated with the power driven wheelchair using the system controller 22', including the various features provided under programming mode. The '983, '005, '981, '666, and '249 applications describe optional components and additional embodiments for power driven wheelchairs and associated components which also apply to the power driven wheelchair and associated components of FIG. 3. The various aspects of FIG. 3 described above may be implemented through hardware, software, firmware, or combinations thereof.

Figure 4:
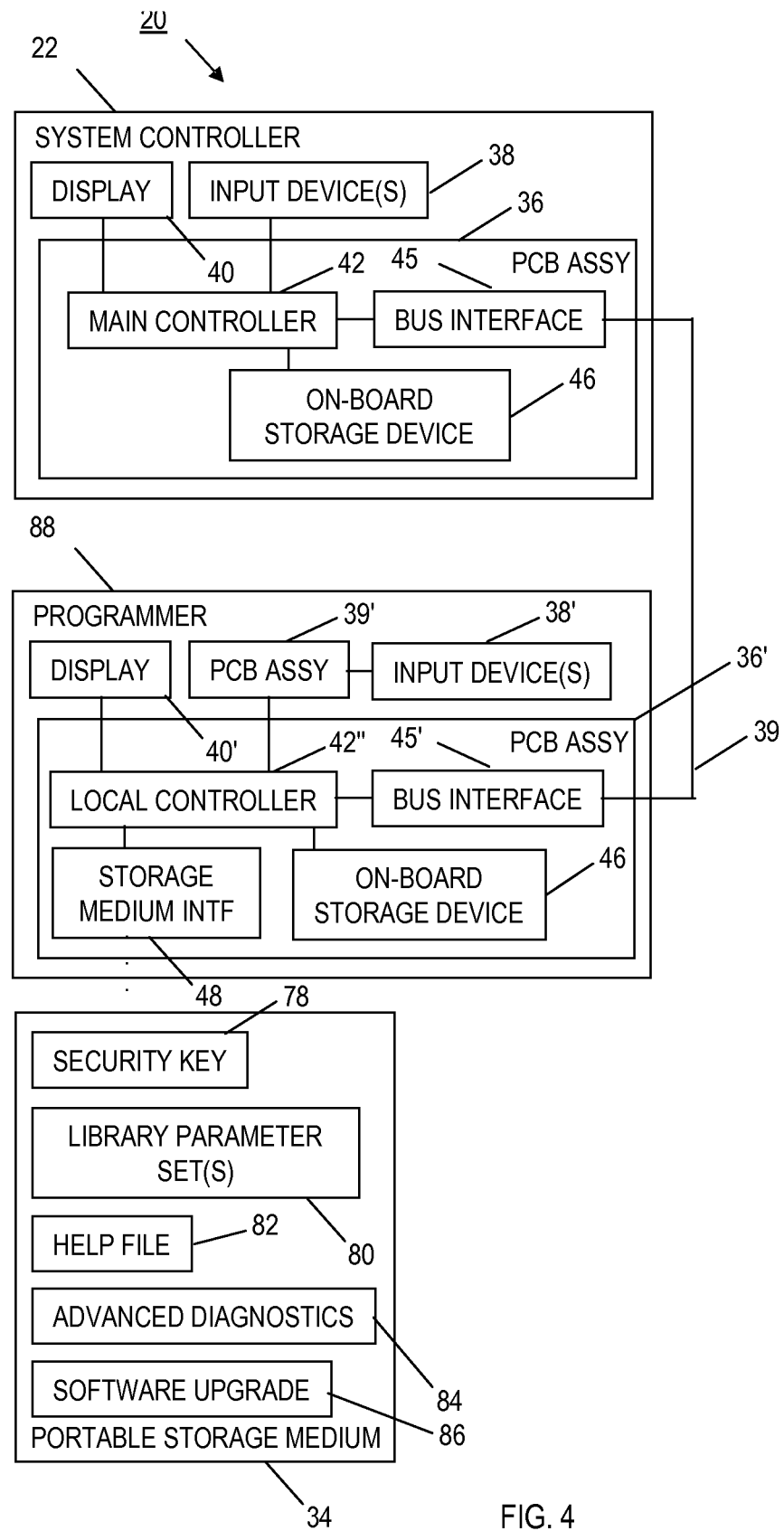
FIG. 4 is a block diagram showing pertinent portions of the exemplary embodiment of the power driven wheelchair of FIG. 2 in communication with an exemplary embodiment of a programmer.

With reference to FIG. 4, the block diagram depicts an exemplary programming configuration for the control system for the power driven wheelchair 20. This programming configuration may include a system controller 22, a portable storage medium 34, and a programmer 88. The system controller 22 and programmer 88 are connected via a cable 39. Communication between the system controller 22 and programmer 88 may be by serial or parallel bus, a network connection, or discrete wiring. The system controller 22 and the portable storage medium 34 have the same characteristics as described above for the control system for the power driven wheelchair 20 of FIG. 2. However, in this configuration, the portable storage medium 34 is used in conjunction with the programmer 88 instead of the controller 22.

With continued reference to FIG. 4, The programmer 88 may include a first PCB assembly 36', one or more input devices 38', a second PCB assembly 39', and a display 40'. The first PCB assembly 36', one or more input devices 38', second PCB assembly 39', and display 40' have the same characteristics as described above for the system controller 22' of FIG. 3. In other words, the programmer 88 is similar to the DISPLAY model system controller of the control system for the power driven wheelchair 20' shown in FIG. 3.

The configuration depicted in FIG. 4 can perform support operations associated with the power driven wheelchair using the programmer 88, including the various features provided under programming mode. The '983, '981, and '249 applications describe optional components and additional embodiments for power driven wheelchairs, programmers, and associated components which also apply to the power driven wheelchair, programmer, and associated components of FIG. 4. The various aspects of FIG. 4 described above may be implemented through hardware, software, firmware, or combinations thereof.

Figure 5:
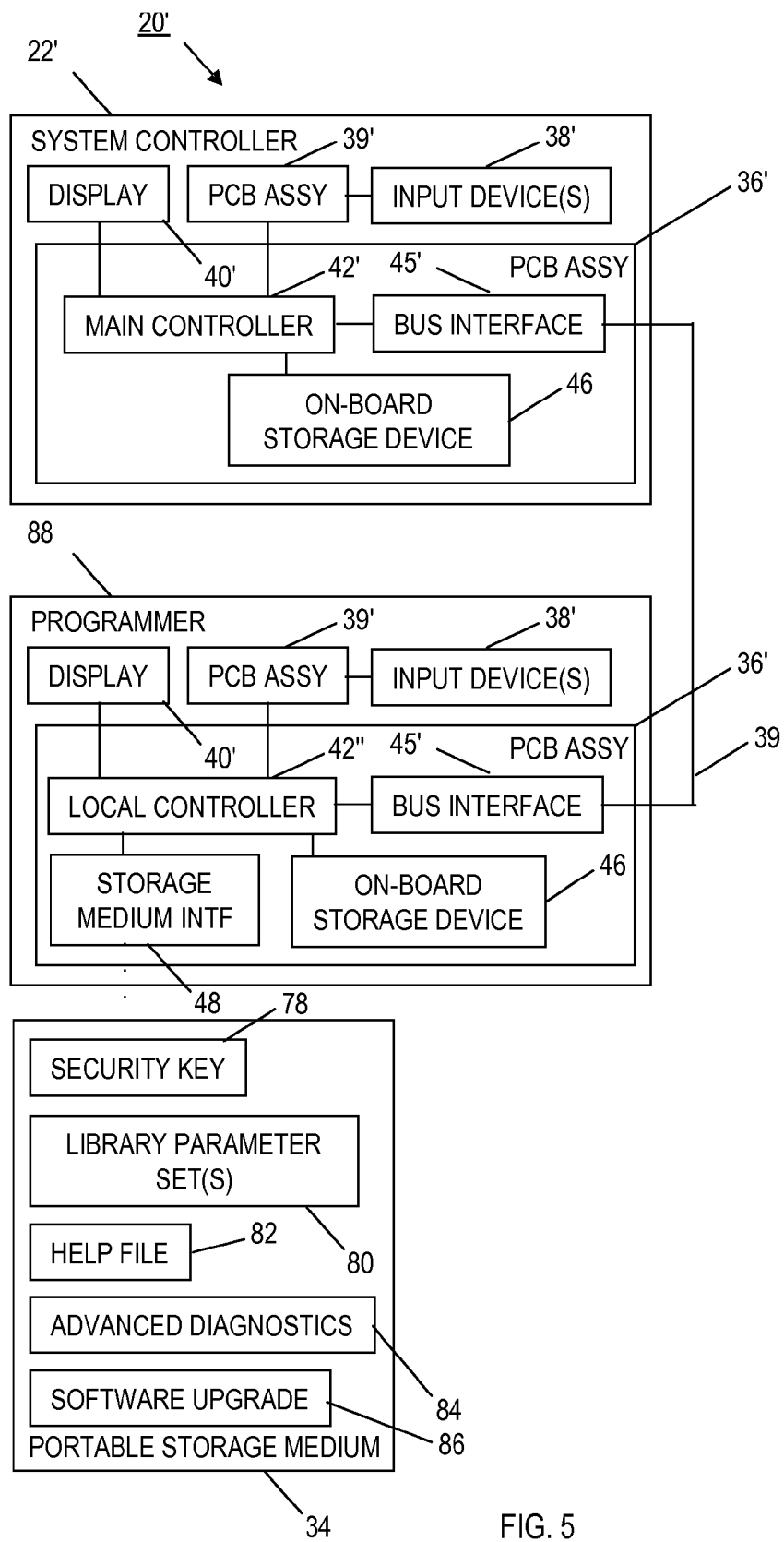
FIG. 5 is a block diagram showing pertinent portions of the exemplary embodiment of the power driven wheelchair of FIG. 3 in communication with the exemplary embodiment of the programmer of FIG. 4.

With reference to FIG. 5, the block diagram depicts an exemplary programming configuration for the control system for the power driven wheelchair 20'. This programming configuration may include a system controller 22', a portable storage medium 34, and a programmer 88. The system controller 22' and programmer 88 are connected via a cable 39. Communication between the system controller 22' and programmer 88 may be by serial or parallel bus, a network connection, or discrete wiring. The portable storage medium 34 has the same characteristics as described above for the control system for the power driven wheelchair 20 of FIG. 2. The system controller 22' has the same characteristics as described above for the control system for the power driven wheelchair 20' of FIG. 3. The programmer 88 has the same characteristics as described above for the programming configuration shown in FIG. 4. However, in this configuration, the system controller 22' is the DISPLAY model instead of a system controller model with a joystick.

The configuration depicted in FIG. 5 can perform support operations associated with the power driven wheelchair using the programmer 88, including the various features provided under programming mode. The '983, '981, and '249 applications describe optional components and additional embodiments for power driven wheelchairs, programmers, and associated components which also apply to the power driven wheelchair, programmer, and associated components of FIG. 5. The various aspects of FIG. 5 described above may be implemented through hardware, software, firmware, or combinations thereof.

Figure 6:
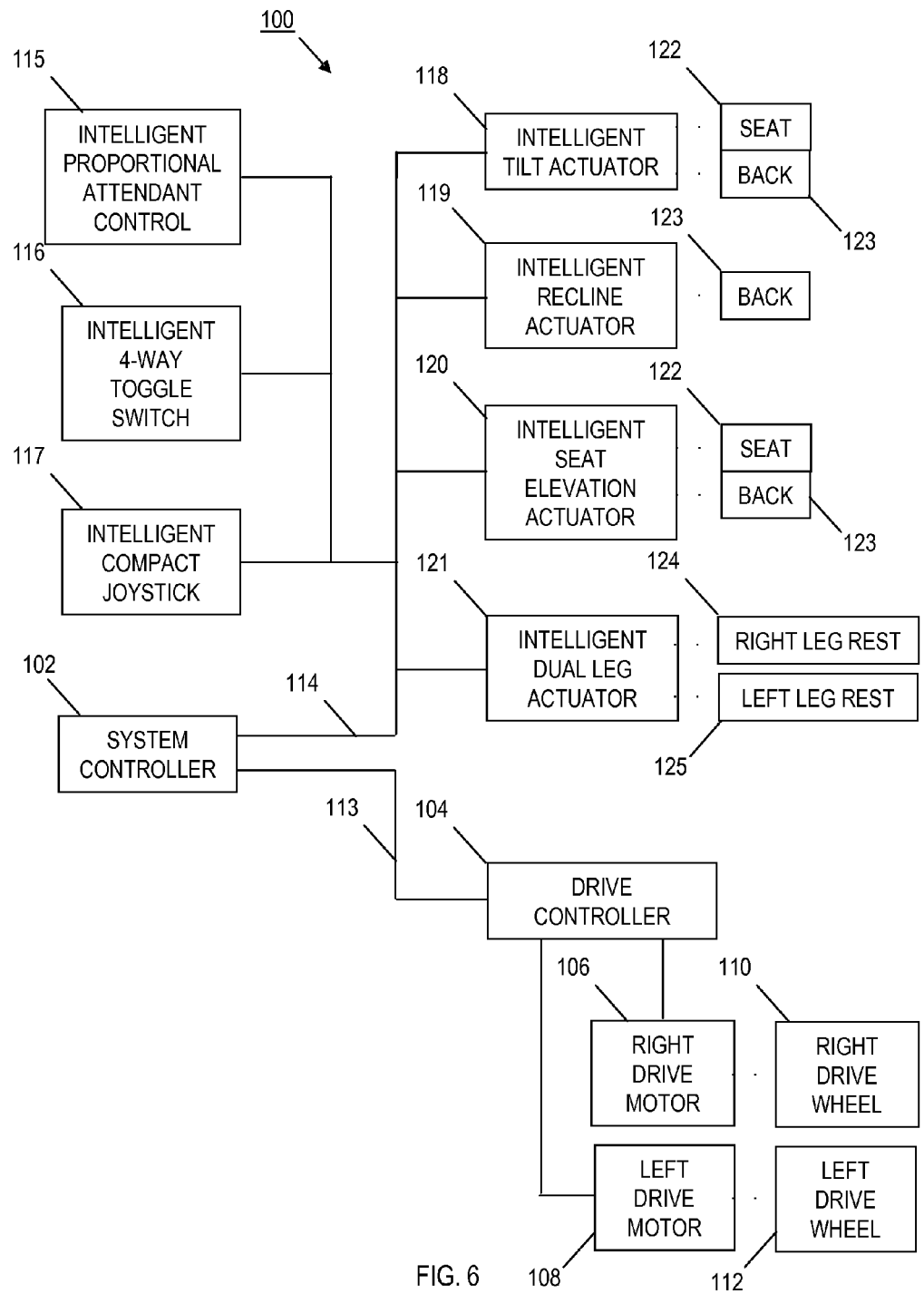
FIG. 6 is a block diagram of yet another exemplary embodiment of a power driven wheelchair.

With reference to FIG. 6, an exemplary embodiment of a control system for a power driven wheelchair 100 is depicted in block diagram fashion. As shown, the control system for the power driven wheelchair 100 may include a system controller 102, a drive controller 104, a right drive motor 106, a left drive motor 108, and a suitable power source (e.g., battery) (not shown). The right drive motor 106 may mechanically interface with the right drive wheel 110. The left drive motor 108 may mechanically interface with the left drive wheel 112. Communication between the system controller 102 and drive controller 104 may be via a first communication bus 113. In various embodiments, the first communication bus 113 may include a serial bus, a parallel bus, a communication network, or combinations thereof. For example, a Shark serial communication bus, developed by Dynamic Controls of New Zealand, may be used to communicate with the drive controller 104.

The control system for the power driven wheelchair 100 may also include a second communication bus 114 to provide communications between the system controller 102 and, for example, an intelligent proportional attendant control 115, an intelligent 4-way toggle switch 116, an intelligent compact joystick 117, an intelligent tilt actuator 118, an intelligent recline actuator 119, an intelligent seat elevation actuator 120, and an intelligent dual leg actuator 121. In various embodiments, the second communication bus 114 may include a serial bus, a parallel bus, a communication network, or combinations thereof. For example, the second communication bus 114 may include a serial bus, such as a CAN bus.

The intelligent tilt actuator 118 and intelligent seat elevation actuator 120 may, for example, mechanically interface with seat and back support surfaces 122, 123 in an independently controlling fashion. Similarly, the intelligent dual leg actuator 121 may mechanically interface with the right and left leg rest support surfaces 124, 125 in an independently controlling fashion. The intelligent recline actuator 119 may, for example, mechanically interface with the back support surface 123 in an independently controlling fashion.

The configuration depicted in FIG. 6 can perform normal and support operations associated with the power driven wheelchair using the system controller 102, including the various features provided under programming mode. The '983, '005, '981, '666, and '249 applications describe optional components and additional embodiments for power driven wheelchairs and associated components which also apply to the power driven wheelchair and associated components of FIG. 6. The various aspects of FIG. 6 described above may be implemented through hardware, software, firmware, or combinations thereof.

Figure 7:
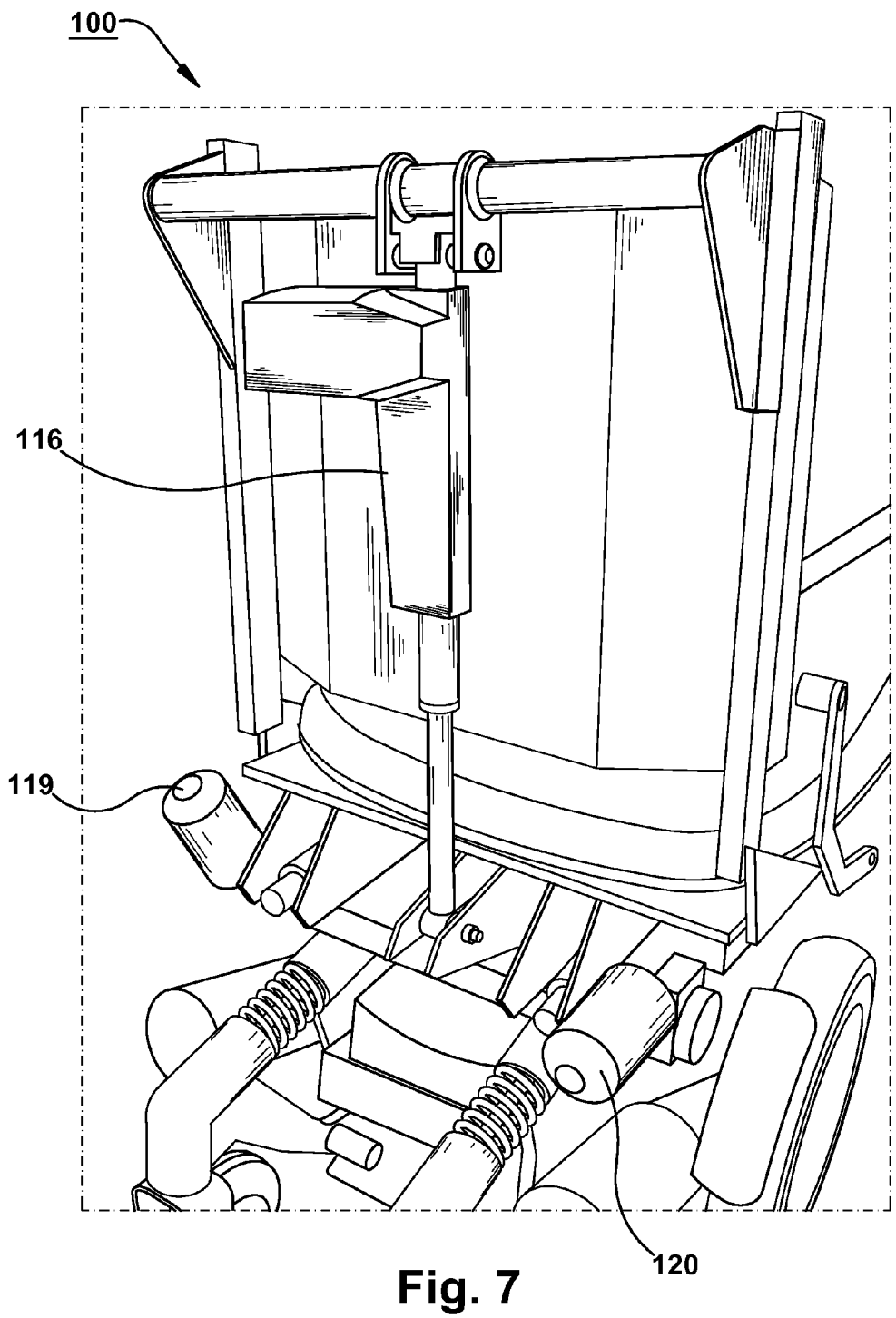
FIG. 7 shows exemplary embodiments of intelligent actuators in a rear view of a power driven wheelchair.

With reference to FIG. 7, a rear view of a power driven wheelchair shows an intelligent tilt actuator 118, an intelligent recline actuator 119, and an intelligent seat elevation actuator 120. The '983, '005, and '249 applications describe optional components and additional embodiments for power driven wheelchairs and associated components which also apply to the power driven wheelchair and associated components of FIG. 7.

Figure 8:
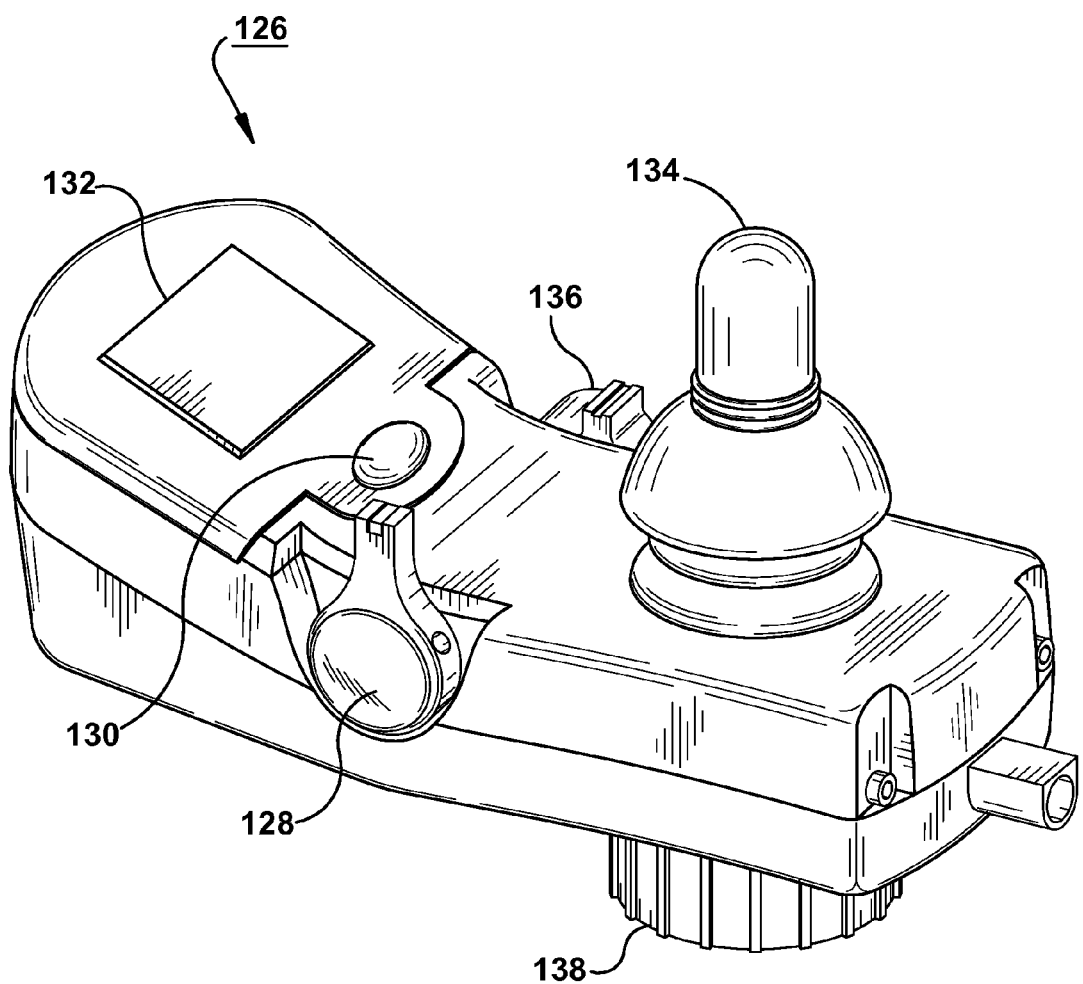
FIGS. 8 through 11 are perspective views of exemplary embodiments of a system controller for a power driven wheelchair.

With reference to FIG. 8, an exemplary embodiment of a system controller 126 may include a power/drive select switch 128, a mode select switch 130, a graphic display 132, a joystick control 134, a speed control 136, and a mounting hub 138. This system controller 126 may be referred to as a multi-purpose joystick (MPJ) model. The MPJ model may also include an SD card slot (not shown) for receiving an SD card. The combination of an SD card slot and SD card is an exemplary embodiment of a storage medium interface 48 (FIG. 2) and portable storage medium 34 (FIG. 2). The MPJ model provides an exemplary construction of the system controller 22 (FIG. 2). Generally, the components of the MPJ model have the same functional characteristics as the components described above for the system controller 22 (FIG. 2). The '983 and '993 applications describe optional components and additional embodiments for an MPJ model system controller and associated components which also apply to the MPJ model system controller and associated components of FIG. 8.

Figure 9:
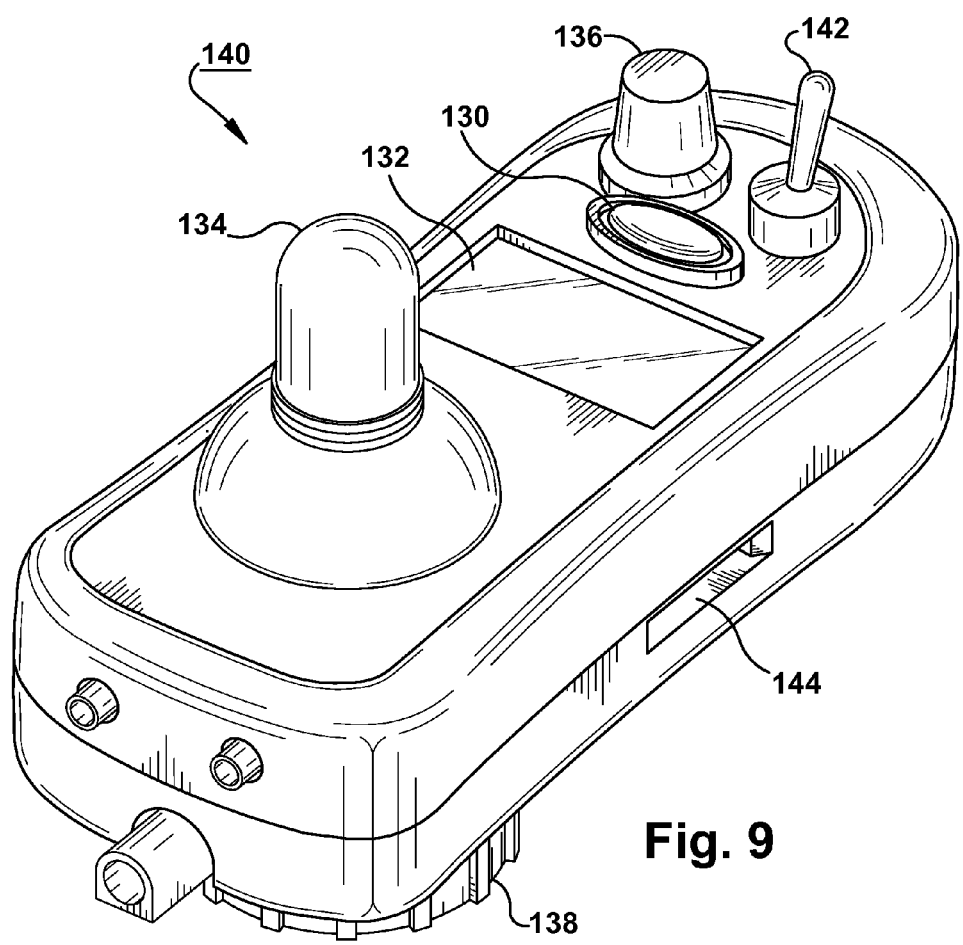

With reference to FIG. 9, another exemplary embodiment of a system controller 140 may include a mode select switch 130, a graphic display 132, a joystick control 134, a speed control 136, a mounting hub 138, a power/drive select switch 142, and an SD card slot 144. This system controller 140 may be referred to as a personalized switch rear-mount (PSR) joystick model or simply a PSR model. The SD card slot 144 is adapted to receive an SD card. The combination of an SD card slot and SD card is an exemplary embodiment of a storage medium interface 48 (FIG. 2) and portable storage medium 34 (FIG. 2). The PSR model provides another exemplary construction of the system controller 22 (FIG. 2). Generally, the components of the PSR model have the same functional characteristics as the components described above for the system controller 22 (FIG. 2). The '983 and '993 applications describe optional components and additional embodiments for a PSR model system controller and associated components which also apply to the PSR model system controller and associated components of FIG. 9.

Figure 10:
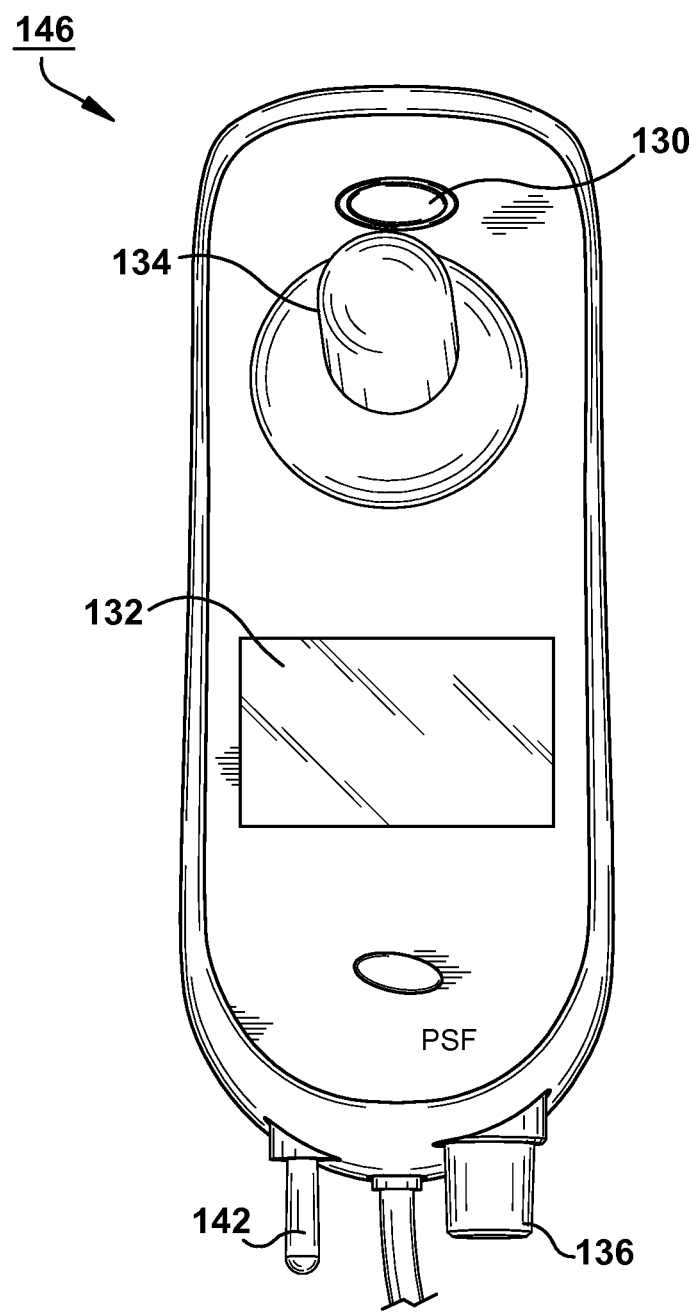

With reference to FIG. 10, still another exemplary embodiment of a system controller 146 may include a mode select switch 130, a graphic display 132, a joystick control 134, a speed control 136, and a power/drive select switch 142. This system controller 146 may be referred to as a personalized switch front-mount (PSF) joystick model or simply a PSF model. A mounting hub (not shown) may also be provided on the PSF model for mounting the system controller 146. The PSF model may also include an SD card slot (not shown) for receiving an SD card. The combination of an SD card slot and SD card is an exemplary embodiment of a storage medium interface 48 (FIG. 2) and portable storage medium 34 (FIG. 2). The PSF model provides yet another exemplary construction of the system controller 22 (FIG. 2). Generally, the components of the PSF model have the same functional characteristics as the components described above for the system controller 22 (FIG. 2). The '983 and '993 applications describe optional components and additional embodiments for a PSF model system controller and associated components which also apply to the PSF model system controller and associated components of FIG. 10.

Figure 11:
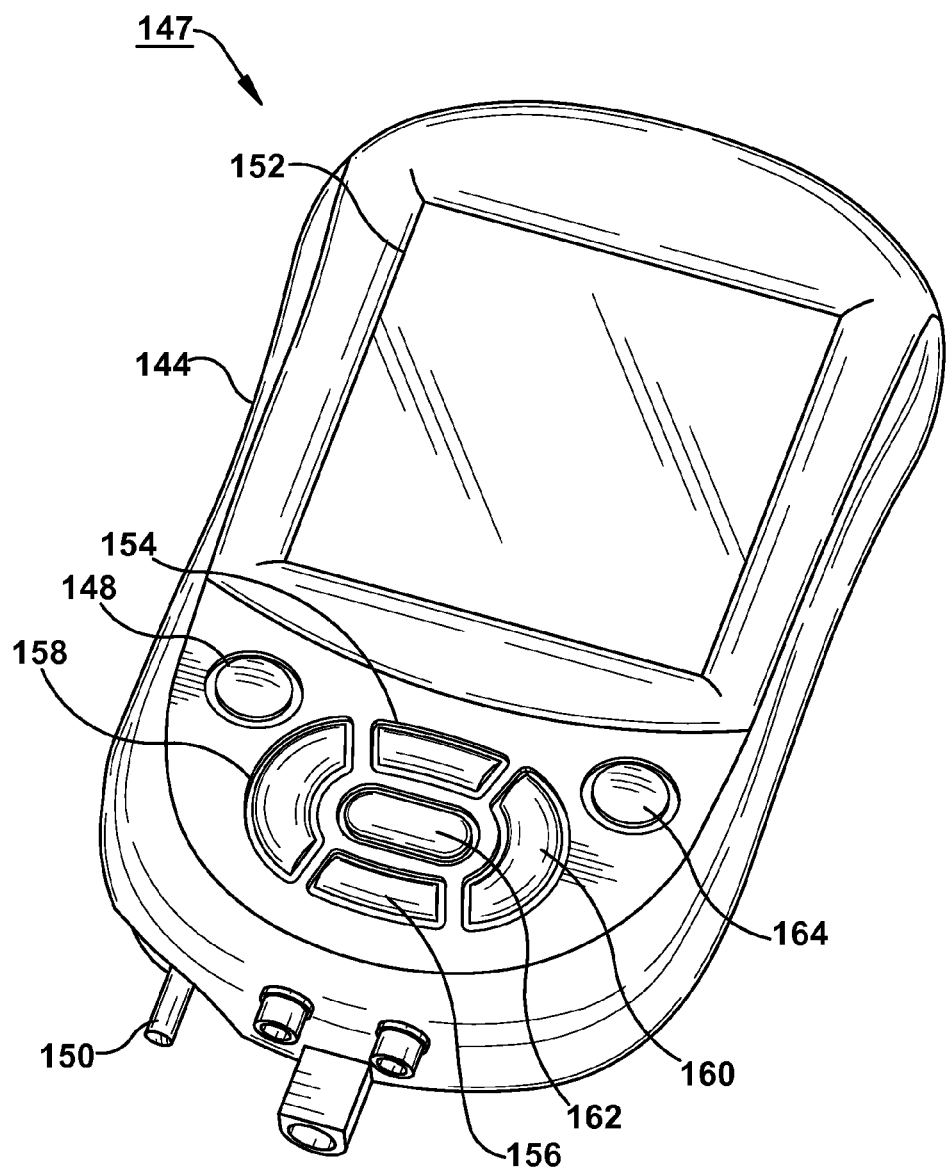

With reference to FIG. 11, yet another exemplary embodiment of a system controller 147 may include an SD card slot 144, an info switch 148, a power switch 150, a graphic display 152, an up direction switch 154, a down direction switch 156, a menu/left direction switch 158, a right direction switch 160, an select switch 162, and a save switch 164. This system controller 147 may be referred to as a DISPLAY model. The DISPLAY model may also include a mounting hub (not shown) for mounting the system controller 147. The SD card slot 144 is adapted to receive an SD card. The combination of an SD card slot and SD card is an exemplary embodiment of a storage medium interface 48 (FIG. 2) and portable storage medium 34 (FIG. 2). The DISPLAY model provides an exemplary construction of the system controller 22' (FIG. 3). Generally, the components of the DISPLAY model have the same functional characteristics as the components described above for the system controller 22' (FIG. 3). The mode select, drive select, and speed control functions described above for system controller models with joystick controls (FIGS. 2 and 8-10), for example, may be implemented through the graphic display 152, navigational control using the up, down, menu/left, and right direction switches 154, 156, 158, 160, and activation of the select or save switches 164, 166. The '983, '993, and '666 applications describe optional components and additional embodiments for a DISPLAY model system controller and associated components which also apply to the DISPLAY model system controller and associated components of FIG. 11.

Figure 12:
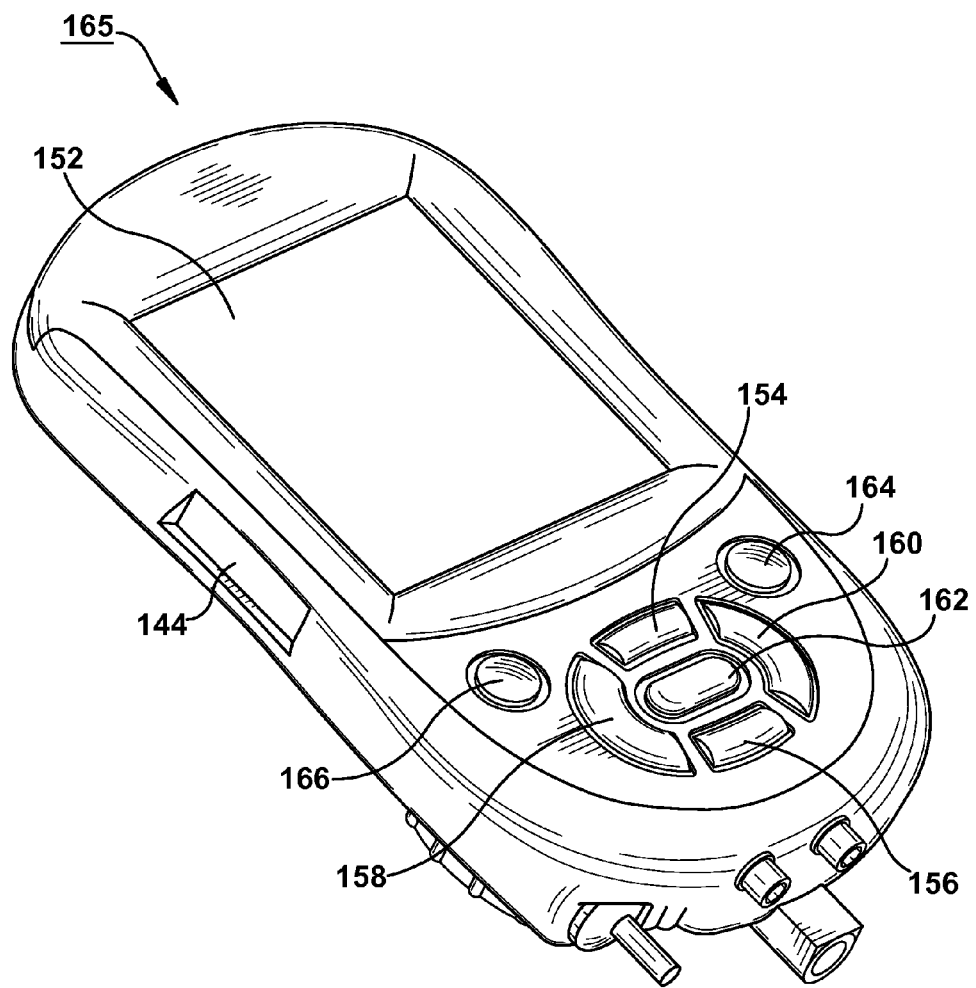
FIG. 12 is a perspective view of an exemplary embodiment of a programmer for a system controller of a power driven wheelchair.

With reference to FIG. 12, an exemplary embodiment of a programmer 165 may include an SD card slot 144, a graphic display 152, an up direction switch 154, a down direction switch 156, a menu/left direction switch 158, a right direction switch 160, an select switch 162, a save switch 164, and a power/info switch 166. The programmer 165 provides an exemplary construction of the programmer 88 (FIG. 4). Generally, the components of the programmer 165 have the same functional characteristics as the components identified above for the DISPLAY model of the system controller 22', 147 (FIGS. 3 and 11). However, the programmer 165 combines the power and info functions in the power/info switch 166. Notably, the programmer 165 does not require the speed control functionality of the DISPLAY model. The programmer 165 may also not require other functionality of the DISPLAY model of the system controller 22', 147 (FIGS. 3 and 11) in relation to driving the power driven wheelchair or positioning the user support surfaces associated with a powered seat or a powered front rigging. The '983, '993, and '666 applications describe optional components and additional embodiments for a programmer and associated components which also apply to the programmer and associated components of FIG. 12.

Figure 13:
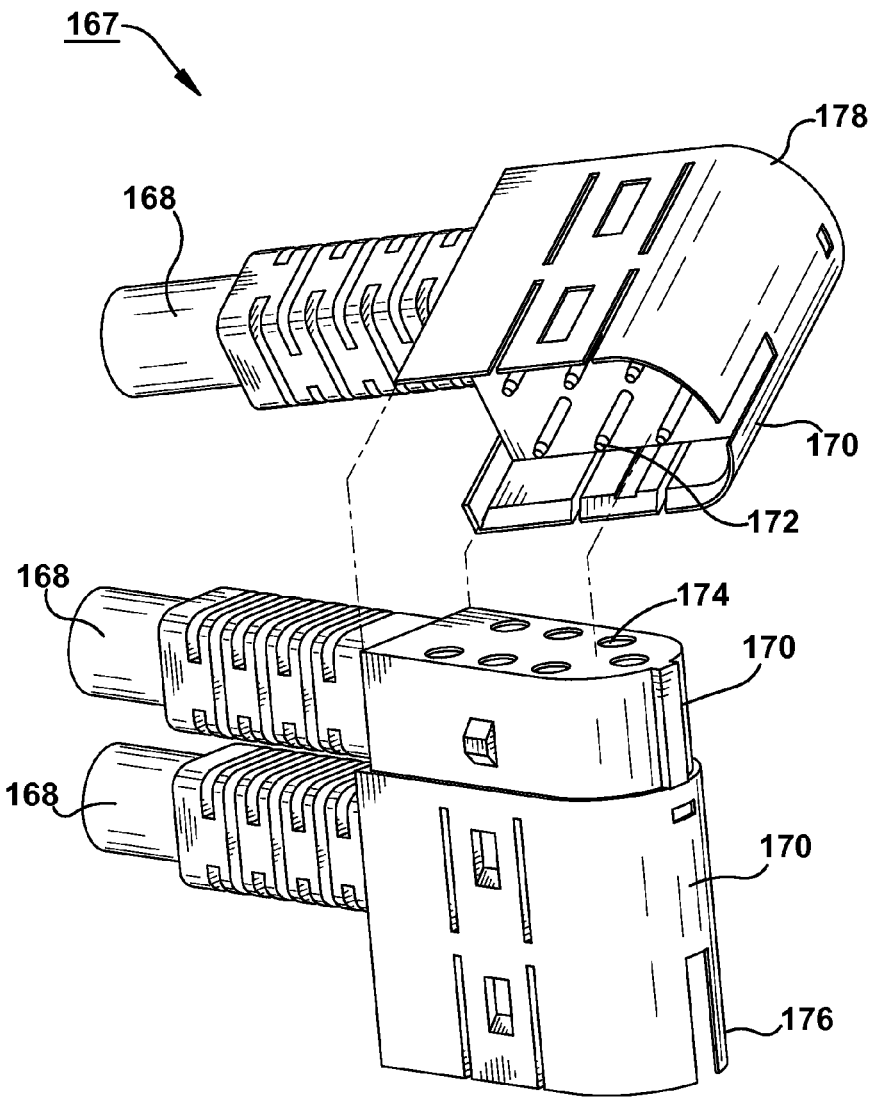
FIG. 13 is a perspective view of an exemplary embodiment of bus cabling for a power driven wheelchair.

With reference to FIG. 13, an exemplary embodiment of bus cabling 167 for interconnecting certain major components of a power driven wheelchair may include cabling for a common bus 35 (FIG. 2), power distribution, and other control or power signals. The bus cabling 167 may connect various major components of the power driven wheelchair, for example, via a cable 168 with a stackable connector 170 on a distal end of the cable 168. The opposing end of the cable 168 may be directly wired to the corresponding component of the power driven wheelchair. Alternatively, the opposing end may include a connector that mates with a corresponding connector on the component of the power driven wheelchair. Each stackable connector 170 may include a plurality of pins 172 extending from a first side of the connector 170 and a corresponding plurality of receptacles 174 recessed into a second side of the connector opposite from the first side. In one embodiment, the connector may include seven pins and seven corresponding receptacles. For example, the seven pins may include two pins for the common bus 35 (FIG. 2), two pins for a second bus 37 (FIG. 3), two pins for primary power, and one pin for switched power. Of course, the stackable connectors 170 may include more or less pins and the pins may carry different signals than those identified here.

As shown, three stackable connectors 170 may fit together in a stackable, interlocking fashion. Additional stackable connectors 170 may mate with both ends of the stack of three connectors 170. A female cover 176 may be used to cover the pins 172 at the bottom of the stack of connectors 170. Similarly, a male cover 178 may be used to cover the receptacles 174 at the top of a stack of connectors 170. The '983 application describes optional components and additional embodiments for a common bus and associated components which also apply to the stackable connectors 170 and associated components of FIG. 13.

Figure 14:
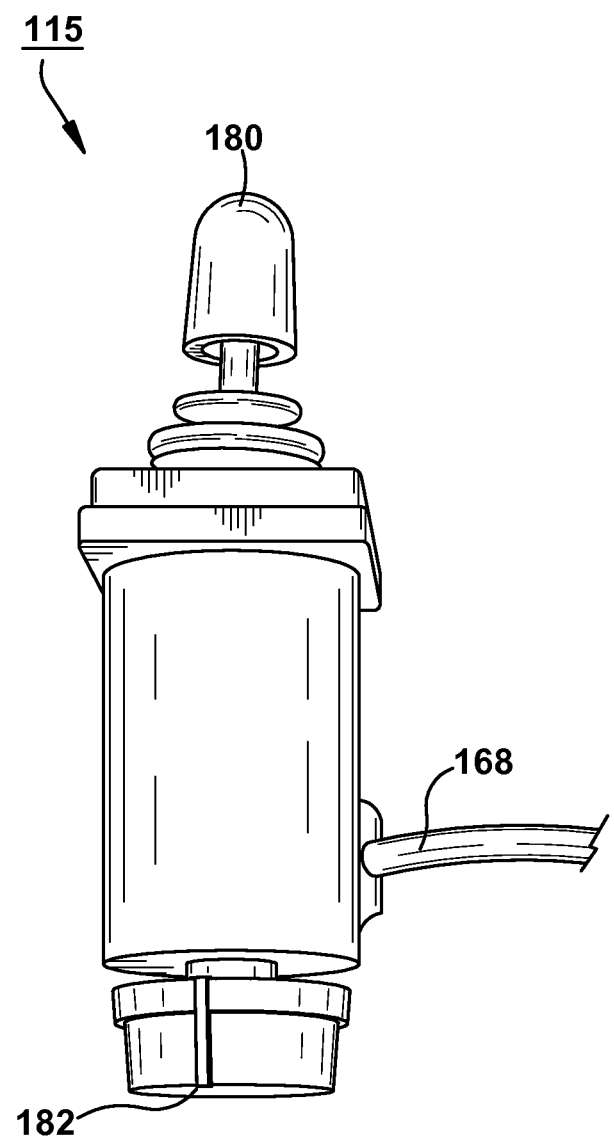
FIG. 14 is a perspective view of an exemplary embodiment of an intelligent proportional attendant control for a power driven wheelchair.

With reference to FIG. 14, an exemplary embodiment of an intelligent proportional attendant control 115 may include a cable 168 for bus cabling 167 (FIG. 13), a joystick control 180, and a speed control 182. The '983 application describes optional components and additional embodiments for a system controllers, remote input devices, and associated components which also apply to the intelligent proportional attendant control 115 and associated components of FIG. 14.

Figure 15:
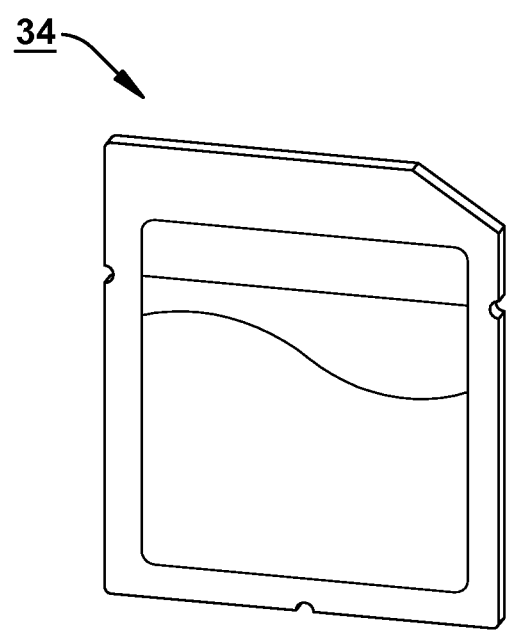
FIG. 15 is a perspective view of an exemplary embodiment of a portable storage medium for a power driven wheelchair.

With reference to FIG. 15, a perspective view of an SD card as an exemplary embodiment of a portable storage medium 34 is provided. The '983 and '666 applications describe optional components and additional embodiments for a portable storage medium and associated components which also apply to the portable storage medium 34 of FIG. 15 and associated components, such as a storage medium interface 48 (FIG. 2) and an SD card slot 144 (FIG. 9).

Figure 16:
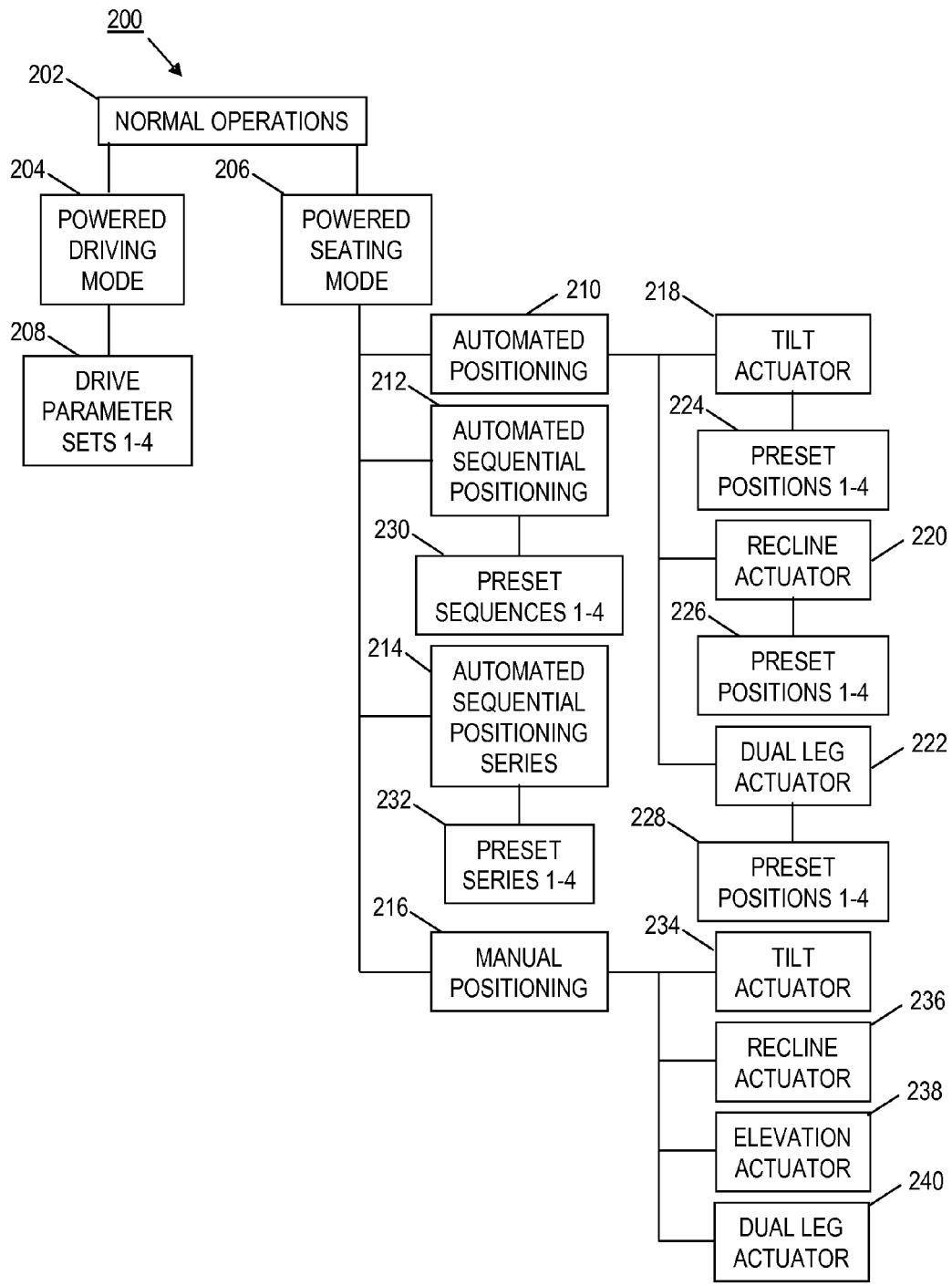
FIG. 16 is a hierarchical diagram of an exemplary embodiment of normal operations for a power driven wheelchair.

With reference to FIG. 16, a hierarchical diagram 200 of an exemplary embodiment of normal operations 202 for a power driven wheelchair is provided. In one embodiment, normal operations 202 may include a powered driving mode 204 and a powered seating mode 206. The powered driving mode 204 may be varied based on selection of a particular drive parameter set from multiple drive parameter sets. For example, the power driving mode 204 may include four drive parameter sets (i.e., drive parameters sets 1-4) 208. The powered seating mode 206 may include various operations to control movement of user support surfaces associated with a powered seat or a powered front rigging in the power driven wheelchair.

The powered seating mode 206 may include an automated positioning selection 210, an automated sequential positioning selection 212, an automated sequential positioning series selection 214, and a manual positioning selection 216. The automated positioning 210 may include, for example, a tilt actuator selection 218, a recline actuator selection 220, and a dual leg actuator selection 222. Each of the tilt actuator 218, recline actuator 220, and dual leg actuator 222 selections may include corresponding selections of a particular preset position from multiple preset positions 224, 226, 228. For example, the tilt actuator 204 may include four preset positions (i.e., preset positions 1-4) 224.

The automated sequential positioning 212 may include selection of a particular preset sequence from multiple preset sequences. For example, the automated sequential positioning 212 may include four preset sequences (i.e., preset sequences 1-4) 230. Each preset sequence for automated sequential positioning 212, for example, may include a plurality of preset positions.

The automated sequential positioning series 214 may include selection of a particular preset series from multiple preset series. For example, the automated sequential positioning series 214 may include four preset series (i.e., preset series 1-4) 232. Each preset series for the automated sequential positioning series 214, for example, may include a plurality of preset sequences. Each preset sequence in a series, for example, may be time-spaced from a previous preset sequence. The manual positioning 216 may include a tilt actuator selection 234, a recline actuator selection 236, an elevation actuator selection 238, and a dual leg actuator selection 240.

The various normal operations may be implemented via menus, icons, input device activations, or combinations thereof. The '983, '005, and '249 applications describe optional components and additional embodiments for certain operations regarding a power driven wheelchair and associated modes and processes which also apply to normal operations 202 of FIG. 16 and associated modes and processes. The various aspects of FIG. 16 described above may be automated, semi-automated, or manual and may be implemented through hardware, software, firmware, or combinations thereof.

Figure 17:
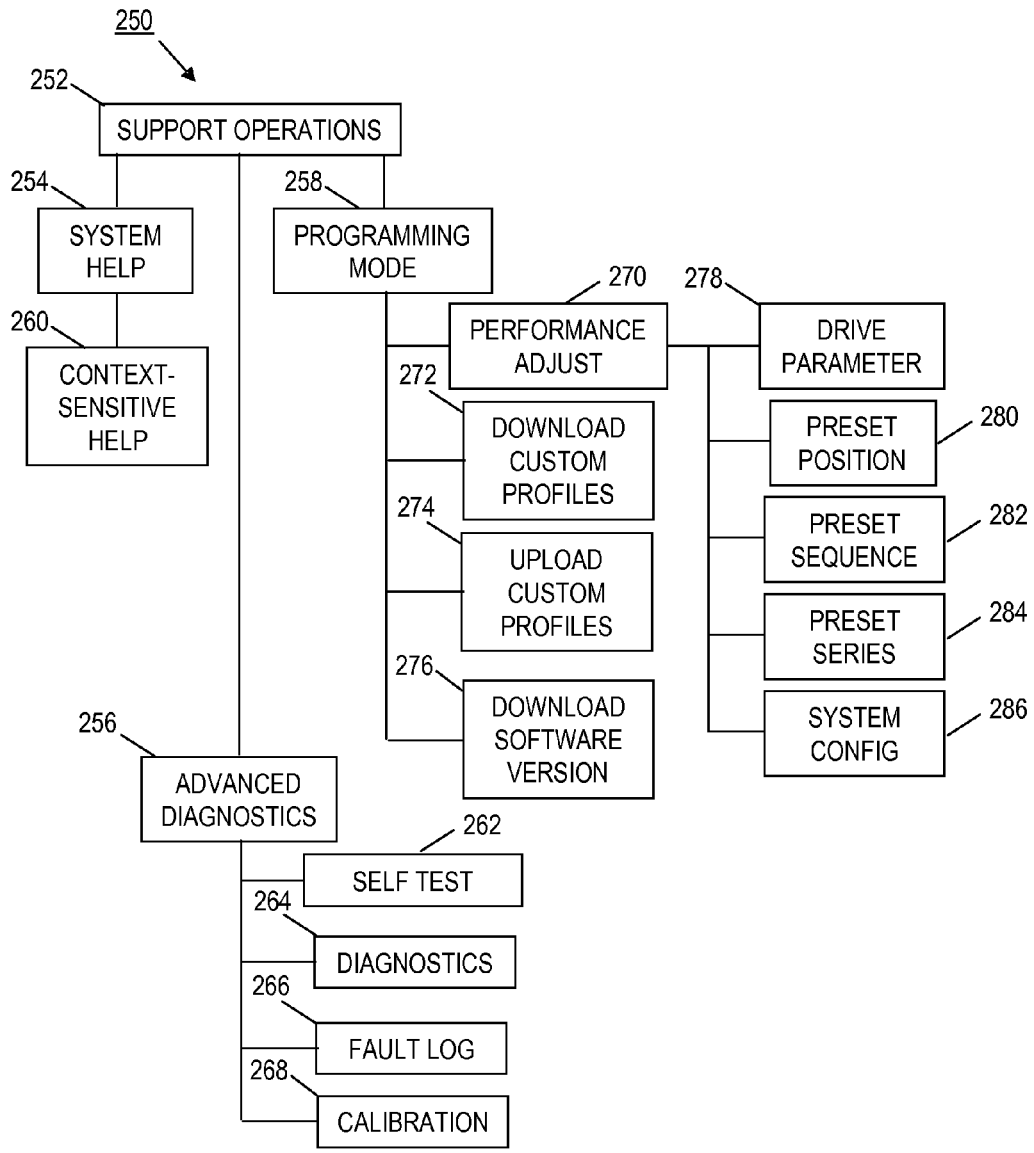
FIG. 17 is a hierarchical diagram of an exemplary embodiment of support operations for a power driven wheelchair.

With reference to FIG. 17, a hierarchical diagram 250 of an exemplary embodiment of support operations 252 for a power driven wheelchair is provided. In one embodiment, support operations may include a system help 254, an advanced diagnostics 256, and a programming mode 258. The system help 254 may include a context-sensitive help selection 260. The advanced diagnostics 256 may include, for example, a self test selection 262, a diagnostics selection 264, a fault log selection 266, and a calibration selection 268.

The programming mode 258 may include a performance adjust selection 270, a download custom profiles selection 272, an upload custom profiles selection 274, and a download software version 276. The performance adjust 270 may include selection of various items for adjustment or modification. For example, one or more drive parameter 278 associated with powered driving, one or more preset position 280 associated with automated positioning, one or more preset sequence 282 associated with automated sequential positioning, one or more preset series 284 associated with automated sequential positioning series, and a system configuration 286 may be selected.

The various support operations may be implemented via menus, icons, input device activations, or combinations thereof. The '983, '005, '981, '666, and '249 applications describe optional components and additional embodiments for certain operations regarding a power driven wheelchair and associated modes and processes which also apply to support operations 252 of FIG. 17 and associated modes and processes. The various aspects of FIG. 17 described above may be automated, semi-automated, or manual and may be implemented through hardware, software, firmware, or combinations thereof.

Figure 18:
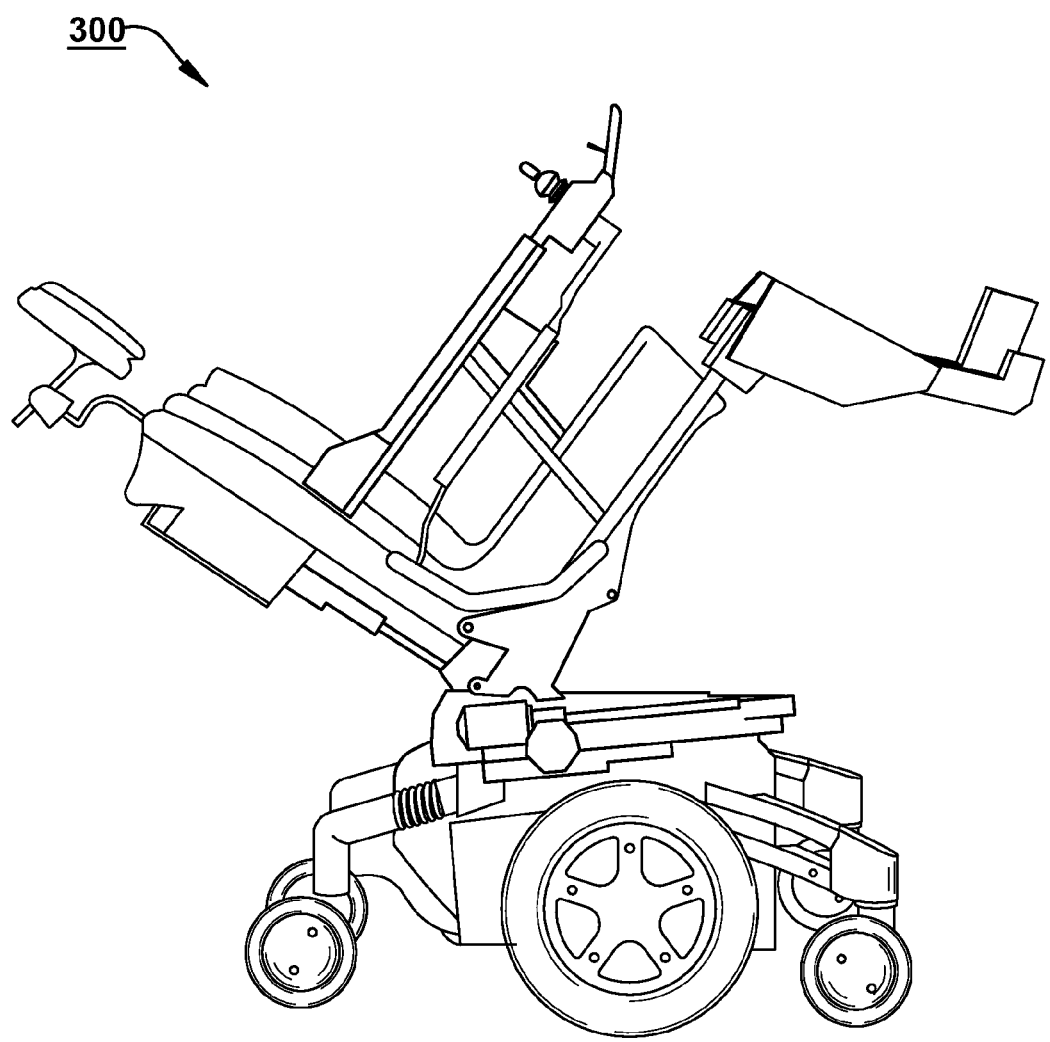
FIG. 18 is a perspective view of an exemplary embodiment of a power driven wheelchair with a powered seat shown in a tilt position.

With reference to FIG. 18, a perspective view of an exemplary embodiment of a power driven wheelchair after it was placed in an exemplary preset tilt position 300 is provided. The '983, '005, and '249 applications describe optional components and additional embodiments for certain operations regarding automated or manual control of user support surfaces in a power driven wheelchair and associated modes and processes which also apply to the preset reclined position 300 of FIG. 18 and associated modes and processes.

Figure 19:
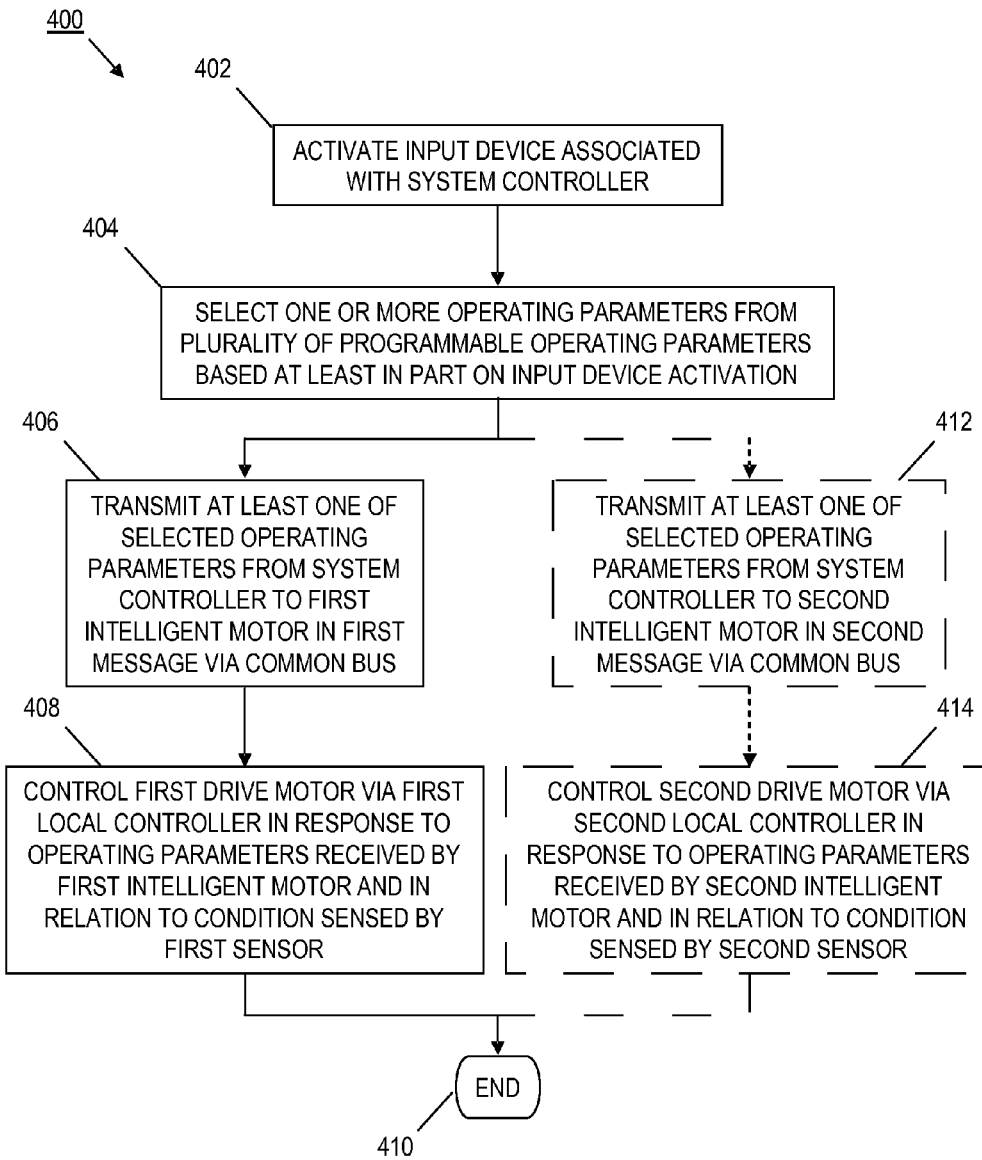
FIG. 19 is a flow chart of an exemplary embodiment of a process for controlling a power driven wheelchair.

With reference to FIG. 19, an exemplary embodiment of a process 400 for controlling a power driven wheelchair begins at 402 where an input device associated with a system controller may be activated. At 404, one or more operating parameters may be selected from a plurality of programmable operating parameters. The selection may be based at least in part on the input device activation. Next, at least one of the selected operating parameters may be transmitted from the system controller to a first intelligent motor in a first message via a common bus (406). The first intelligent motor may include a first drive motor, a first local controller in operative communication with the first drive motor, and a first sensor sensing a condition associated with the first drive motor and in operative communication with the first local controller. At 408, the first drive motor may be controlled via the first local controller in response to operating parameters received by the first intelligent motor and in relation to the condition sensed by the first sensor. The first local controller may use the operating parameters and sensed condition to control the first drive motor in closed-loop control fashion. Again, at 410, the process has reached its end.

In another embodiment, the process 400 may advance from 404 to 412 where at least one of the selected operating parameters may be transmitted from the system controller to a second intelligent motor in a second message via the common bus. The second intelligent motor may include a second drive motor, a second local controller in operative communication with the second drive motor, and a second sensor sensing a condition associated with the second drive motor and in operative communication with the second local controller. At 414, the second drive motor may be controlled via the second local controller in response to operating parameters received by the second intelligent motor and in relation to the condition sensed by the second sensor. The second local controller may use the operating parameters and sensed condition to control the second drive motor in closed-loop control fashion. Again, at 410, the process has reached its end. The various aspects of FIG. 19 described above may be automated, semi-automated, or manual and may be implemented through hardware, software, firmware, or combinations thereof.

Figure 20:
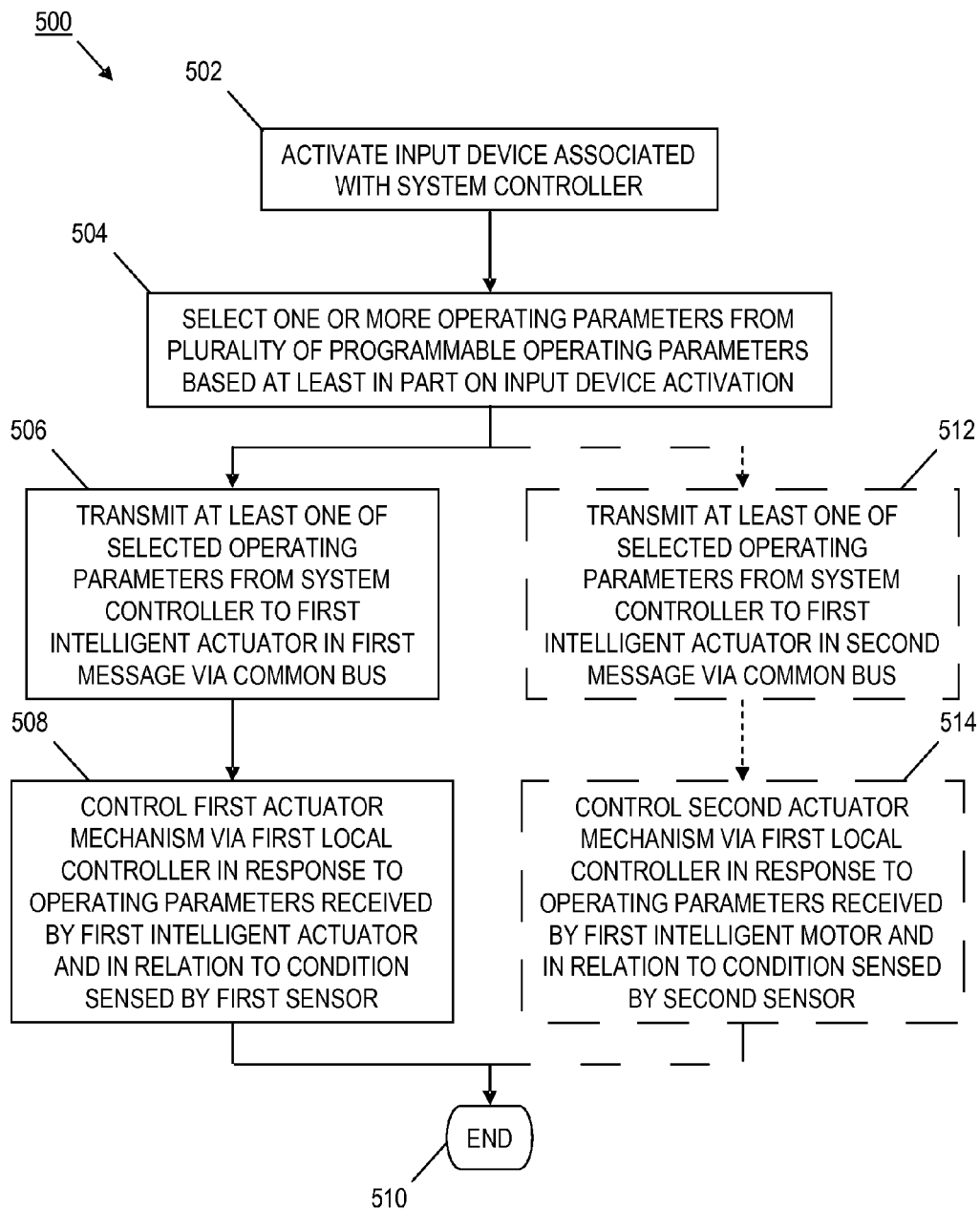
FIG. 20 is a flow chart of another exemplary embodiment of a process for controlling a power driven wheelchair.

With reference to FIG. 20, another exemplary embodiment of a process 500 for controlling a power driven wheelchair begins at 502 where an input device associated with a system controller may be activated. At 504, one or more operating parameters may be selected from a plurality of programmable operating parameters. The selection may be based at least in part on the input device activation. Next, at least one of the selected operating parameters may be transmitted from the system controller to a first intelligent actuator in a first message via a common bus (506). The first intelligent actuator may include a first actuator mechanism, a first local controller in operative communication with the first actuator mechanism, and a first sensor sensing a condition associated with the first actuator mechanism and in operative communication with the first local controller. At 508, the first actuator mechanism may be controlled via the first local controller in response to operating parameters received by the first intelligent actuator and in relation to the condition sensed by the first sensor. The first local controller may use the operating parameters and sensed condition to control the first actuator mechanism in closed-loop control fashion. At 510, the process has reached its end.

In another embodiment, the first intelligent actuator may include a second actuator mechanism in operative communication with the first local controller and a second sensor sensing a condition associated with the second actuator mechanism and in operative communication with the first local controller. In this embodiment, the process 500 may advance from 504 to 512 where at least one of the selected operating parameters may be transmitted from the system controller to the first intelligent actuator in a second message via the common bus. At 514, the second actuator mechanism may be controlled via the first local controller in response to operating parameters received by the first intelligent actuator and in relation to the condition sensed by the second sensor. The first local controller may use the operating parameters and sensed condition to control the second actuator mechanism in closed-loop control fashion. Again, at 510, the process has reached its end. The various aspects of FIG. 20 described above may be automated, semi-automated, or manual and may be implemented through hardware, software, firmware, or combinations thereof.

Figure 21:
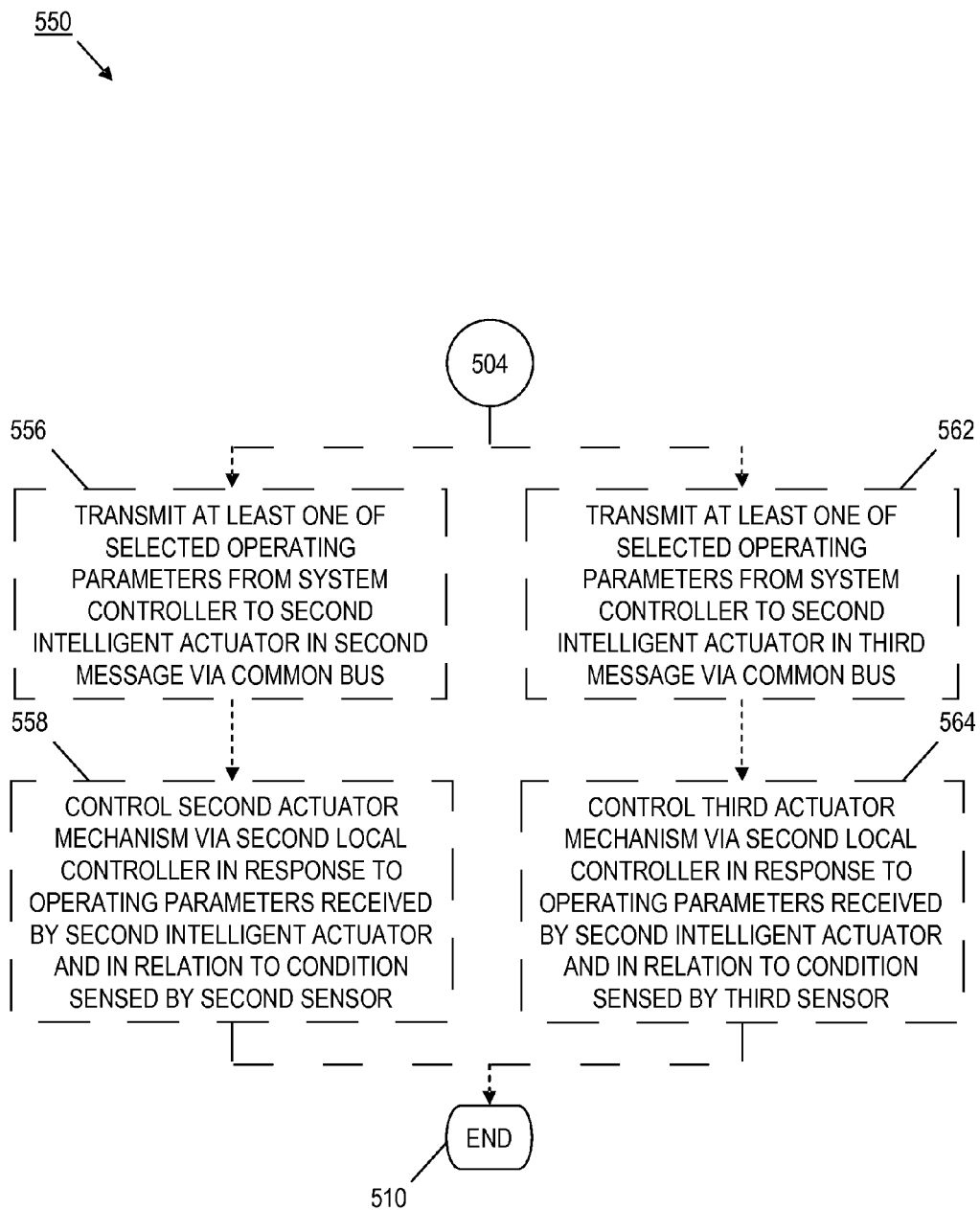
FIG. 21, in conjunction with FIG. 20, is a flow chart of yet another exemplary embodiment of a process for controlling a power driven wheelchair.

With reference to FIGS. 20 and 21, yet another exemplary embodiment of a process 550 for controlling a power driven wheelchair includes 502 and 504. In this embodiment, the process 550 may advance from 504 to 556 where at least one of the selected operating parameters may be transmitted from the system controller to a second intelligent actuator in a second message via the common bus. The second intelligent actuator may include a second actuator mechanism, a second local controller in operative communication with the second actuator mechanism, and a second sensor sensing a condition associated with the second actuator mechanism and in operative communication with the second local controller. At 558, the second actuator mechanism may be controlled via the second local controller in response to operating parameters received by the second intelligent actuator and in relation to the condition sensed by the second sensor. Again, at 510, the process has reached its end for this embodiment.

In another embodiment, the second intelligent actuator may include a third actuator mechanism in operative communication with the second local controller and a third sensor sensing a condition associated with the third actuator mechanism and in operative communication with the second local controller. In this embodiment, the process 550 may advance from 504 to 562 where at least one of the selected operating parameters may be transmitted from the system controller to the second intelligent actuator in a third message via the common bus. At 564, the third actuator mechanism may be controlled via the second local controller in response to operating parameters received by the second intelligent actuator and in relation to the condition sensed by the third sensor. Again, for this embodiment, the process has reached its end at 510. The various aspects of FIGS. 20 and 21 described above may be automated, semi-automated, or manual and may be implemented through hardware, software, firmware, or combinations thereof.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. A method of operating a power driven wheelchair, including:
   activating an input device associated with a system controller associated with the wheelchair;
   selecting one or more operating parameters from a plurality of programmable operating parameters based at least in part on the input device activation;
   transmitting at least one of the selected operating parameters from the system controller to a first local controller assembly associated with a first controllable component of the wheelchair in a first message via a bus, the first local controller assembly including a first drive motor or actuator mechanism, a first local controller having circuitry to drive the first drive motor or actuator mechanism, and a first sensor sensing a condition associated with the first drive motor or actuator mechanism and in operative communication with the first local controller; and
   controlling the first drive motor or actuator mechanism via the first local controller in response to operating parameters received by the first local controller assembly and in relation to the condition sensed by the first sensor;
   wherein the system controller is disposed in a first housing at a first location on the wheelchair and the first local controller is disposed in a second housing at a second location on the wheelchair.

2. The method of claim 1, further including:
   transmitting at least one of the selected operating parameters from the system controller to a second local controller assembly associated with a second controllable component of the wheelchair in a second message via a bus, the second local controller assembly including a second drive motor or actuator mechanism, a second local controller having circuitry to drive the second drive motor or actuator mechanism, and a second sensor sensing a condition associated with the second drive motor or actuator mechanism and in operative communication with the second local controller; and
   controlling the second drive motor or actuator mechanism via the second local controller in response to operating parameters received by the second local controller assembly and in relation to the condition sensed by the second sensor;
   wherein the second local controller is disposed in a third housing at a third location on the wheelchair.

3. The method of claim 2, further including:
   transmitting at least one of the selected operating parameters from the system controller to a third local controller assembly associated with a third controllable component of the wheelchair in a third message via a bus, the third local controller assembly including a third drive motor or actuator mechanism, a third local controller having circuitry to drive the third drive motor or actuator mechanism, and a third sensor sensing a condition associated with the third drive motor or actuator mechanism and in operative communication with the third local controller; and
   controlling the third drive motor or actuator mechanism via the third local controller in response to operating parameters received by the third local controller assembly and in relation to the condition sensed by the third sensor;
   wherein the third local controller is disposed in a fourth housing at a fourth location on the wheelchair.

4. The method of claim 3, further including:
   transmitting at least one of the selected operating parameters from the system controller to a fourth local controller assembly associated with a fourth controllable component of the wheelchair in a fourth message via a bus, the fourth local controller assembly including a fourth drive motor or actuator mechanism, a fourth local controller having circuitry to drive the fourth drive motor or actuator mechanism, and a fourth sensor sensing a condition associated with the fourth drive motor or actuator mechanism and in operative communication with the fourth local controller; and
   controlling the fourth drive motor or actuator mechanism via the fourth local controller in response to operating parameters received by the fourth local controller assembly and in relation to the condition sensed by the fourth sensor;

wherein the fourth local controller is disposed in a fifth housing at a fifth location on the wheelchair.

5. A method of operating a power driven wheelchair, including:
activating an input device associated with a system controller associated with the wheelchair;
selecting one or more operating parameters from a plurality of programmable operating parameters based at least in part on the input device activation;
programming at least one of the selected operating parameters when the system controller is in a support mode; and
transmitting at least one of the selected operating parameters from the system controller to a first local controller assembly associated with a first controllable component of the wheelchair in a first message via a bus when the system controller is in a normal mode, the first local controller assembly including a first drive motor or actuator mechanism, a first local controller having circuitry to drive the first drive motor or actuator mechanism, and a first sensor sensing a condition associated with the first drive motor or actuator mechanism and in operative communication with the first local controller; and
controlling the first drive motor or actuator mechanism via the first local controller in response to operating parameters received by the first local controller assembly and in relation to the condition sensed by the first sensor;
wherein the system controller is disposed in a first housing at a first location on the wheelchair and the first local controller is disposed in a second housing at a second location on the wheelchair.

6. The method of claim 5, further including:
transmitting at least one of the selected operating parameters from the system controller to a second local controller assembly associated with a second controllable component of the wheelchair in a second message via a bus when the system controller is in the normal mode, the second local controller assembly including a second drive motor or actuator mechanism, a second local controller having circuitry to drive the second drive motor or actuator mechanism, and a second sensor sensing a condition associated with the second drive motor or actuator mechanism and in operative communication with the second local controller; and
controlling the second drive motor or actuator mechanism via the second local controller in response to operating parameters received by the second local controller assembly and in relation to the condition sensed by the second sensor;

wherein the second local controller is disposed in a third housing at a third location on the wheelchair.

7. The method of claim 6, further including:
transmitting at least one of the selected operating parameters from the system controller to a third local controller assembly associated with a third controllable component of the wheelchair in a third message via a bus when the system controller is in the normal mode, the third local controller assembly including a third drive motor or actuator mechanism, a third local controller having circuitry to drive the third drive motor or actuator mechanism, and a third sensor sensing a condition associated with the third drive motor or actuator mechanism and in operative communication with the third local controller; and
controlling the third drive motor or actuator mechanism via the third local controller in response to operating parameters received by the third local controller assembly and in relation to the condition sensed by the third sensor;
wherein the third local controller is disposed in a fourth housing at a fourth location on the wheelchair.

8. The method of claim 7, further including:
transmitting at least one of the selected operating parameters from the system controller to a fourth local controller assembly associated with a fourth controllable component of the wheelchair in a fourth message via a bus when the system controller is in the normal mode, the fourth local controller assembly including a fourth drive motor or actuator mechanism, a fourth local controller having circuitry to drive the fourth drive motor or actuator mechanism, and a fourth sensor sensing a condition associated with the fourth drive motor or actuator mechanism and in operative communication with the fourth local controller; and
controlling the fourth drive motor or actuator mechanism via the fourth local controller in response to operating parameters received by the fourth local controller assembly and in relation to the condition sensed by the fourth sensor;
wherein the fourth local controller is disposed in a fifth housing at a fifth location on the wheelchair.

9. The method of claim 5, wherein the normal mode is a powered driving mode and the first local controller assembly is a first motor assembly.

10. The method of claim 5, wherein the normal mode is a powered seating mode and the first local controller assembly is a first actuator assembly.

11. The method of claim 5, wherein the support mode is a programming mode and the first local controller assembly is a first motor assembly.

12. The method of claim 5, wherein the support mode is a programming mode and the first local controller assembly is a first actuator assembly.

* * * * *